US008218190B2

(12) United States Patent
Kanaya et al.

(10) Patent No.: US 8,218,190 B2
(45) Date of Patent: Jul. 10, 2012

(54) DOCUMENT PROCESSING APPARATUS AND METHOD

(75) Inventors: Wataru Kanaya, Chofu (JP); Michiko Kanaya, legal representative, Chofu (JP); Koji Nakagiri, Kawasaki (JP); Yasuo Mori, Yokohama (JP); Makoto Tomita, Kawasaki (JP); Junko Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1410 days.

(21) Appl. No.: 11/105,484

(22) Filed: Apr. 14, 2005

(65) Prior Publication Data

US 2005/0243371 A1 Nov. 3, 2005

(30) Foreign Application Priority Data

Apr. 16, 2004 (JP) ................................. 2004-121871

(51) Int. Cl.
*G06K 15/00* (2006.01)
(52) U.S. Cl. ......... 358/1.18; 358/1.1; 715/274; 715/277
(58) Field of Classification Search ................... 358/1.1, 358/1.18; 715/274, 277
See application file for complete search history.

(56) References Cited

U.S. PATENT DOCUMENTS

| | | | | |
|---|---|---|---|---|
| 5,953,007 A * | 9/1999 | Center et al. | | 715/764 |
| 6,406,199 B1 | 6/2002 | Hayashi | | |
| 6,701,011 B1 * | 3/2004 | Nakajima | | 382/167 |
| 7,131,067 B1 | 10/2006 | Ikeda | | |
| 7,177,045 B2 * | 2/2007 | Goel et al. | | 358/1.18 |
| 2003/0184806 A1 | 10/2003 | Nara et al. | | |
| 2004/0133856 A1 | 7/2004 | Miyazato et al. | | |
| 2004/0239955 A1 * | 12/2004 | Uchida et al. | | 358/1.1 |

FOREIGN PATENT DOCUMENTS

| | | |
|---|---|---|
| JP | 05-028134 A | 2/1993 |
| JP | 9-123562 | 5/1997 |
| JP | 2001-101163 A | 4/2001 |
| JP | 2001-333270 | 11/2001 |
| JP | 2002-019213 A | 1/2002 |
| JP | 2003-060885 | 2/2003 |
| JP | 2003-162404 | 6/2003 |
| JP | 2003-326793 A | 11/2003 |
| JP | 2004-078997 A | 3/2004 |

* cited by examiner

*Primary Examiner* — King Poon
*Assistant Examiner* — Lawrence Wills
(74) *Attorney, Agent, or Firm* — ;Fitzpatrick, Cella, Harper & Scinto

(57) ABSTRACT

This invention relates to a document processing apparatus. The document processing apparatus capable of editing the output format of document data formed from a document page includes a page repeat layout setting save unit which saves page repeat layout setting information designated by the user, a document generator which, when a page repeat layout is set by the page repeat layout setting information, generates output document data containing a page repeat printing page prepared by laying out a basic page by a plurality of number of times on one print page in accordance with the page repeat layout setting information by defining as the basic page one print page used when no page repeat layout is set, and a display controller which displays the document data in a print form in a display window on the basis of the output document data.

11 Claims, 33 Drawing Sheets

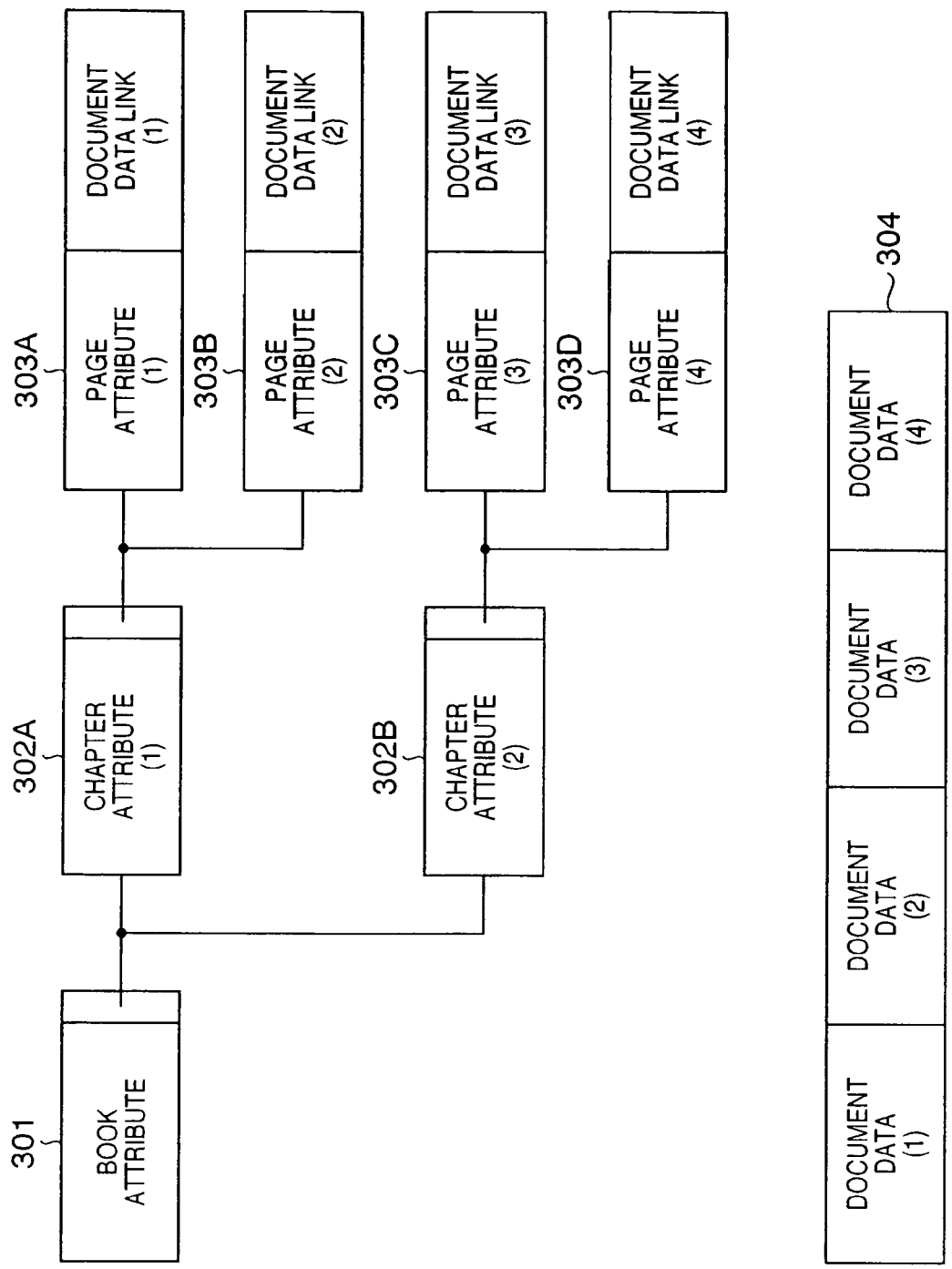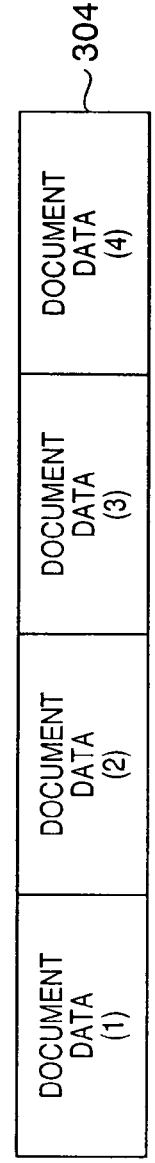
FIG. 3A
FIG. 3B

FIG. 4A

| NO | ATTRIBUTE INFORMATION | VALUES | CONTENTS |
|---|---|---|---|
| 1 | PRINTING METHOD | SINGLE-SIDED/ DOUBLE-SIDED/ BOOKBINDING PRINTING | |
| 2 | PAPER SIZE | DOCUMENT SIZE/ FIXED SIZE | · Z-FOLD IS DESIGNATED WHEN "A4+A3", "B4+B3", OR "LETTER+ LEDGER (11x17)" IS DESIGNATED.<br>· DOCUMENT SIZE OF FIRST CHAPTER/PAGE IS AUTOMATICALLY SELECTED WHEN BOOKBINDING PRINTING OR N-up PRINTING IS DESIGNATED. |
| 3 | PAPER ORIENTATION | PORTRAIT/LANDSCAPE | · SELECTABLE ONLY FOR FIXED SIZE |
| 4 | BINDING MARGIN / BINDING DIRECTION | | · SHIFT/ENLARGEMENT & REDUCTION CAN BE DESIGNATED. |
| 5 | N-up PRINTING | NUMBER OF PAGES/ LAYOUT ORDER/BORDER LINE/LAYOUT POSITION, ETC. | · LAYOUT POSITION: NINE PATTERNS<br>· X1 PRINTING CAN BE DESIGNATED. |
| 6 | ENLARGEMENT/ REDUCTION | ON/OFF | ON/OFF CAN BE AUTOMATICALLY DESIGNATED WHEN PAPER SIZE IS FIXED SIZE OR N-up PRINTING IS SELECTED |
| 7 | WATERMARK | | · WATERMARK CAN BE DESIGNATED INDIVIDUALLY IN LOGICAL OR PHYSICAL PAGES.<br>· ALL CHAPTERS/PAGES ARE TARGETED. |

FIG. 4B

| | | |
|---|---|---|
| 8 | HEADER/FOOTER | • HEADER/FOOTER CAN BE DESIGNATED INDIVIDUALLY IN LOGICAL OR PHYSICAL PAGES.<br>• ALL CHAPTERS/PAGES ARE TARGETED. |
| 9 | DELIVERY METHOD | STAPLING/PUNCH HOLE • STAPLING/PUNCHING ONLY IN SINGLE-/DOUBLE-SIDED PRINTING<br>• STAPLING AT ONE/TWO PORTIONS |
| 10 | DETAILS OF BOOKBINDING | OPENING DIRECTION/ SADDLE STITCH/ ENLARGEMENT & REDUCTION DESIGNATION/BINDING MARGIN/FASCICLE DESIGNATION, ETC. — • ONLY IN BOOKBINDING PRINTING |
| 11 | FRONT/BACK COVER | • PRINTING IS DESIGNATED FOR 1/2 FRONT COVER OR 1/2 BACK COVER.<br>• FEED PORT (INCLUDING INSERTER) IS DESIGNATED. |
| 12 | INDEX PAPER | • PRINTING OF CHARACTER STRING ON INDEX PORTION OR ANNOTATION ON INDEX PAPER CAN BE SET.<br>• BOOKBINDING PRINTING CANNOT BE DESIGNATED. |
| 13 | INSERTING PAPER | • FEED PORT (INCLUDING INSERTER) IS DESIGNATED.<br>• DOCUMENT DATA CAN BE PRINTED ON INSERTED PAPER.<br>• BOOKBINDING PRINTING CANNOT BE DESIGNATED. |
| 14 | CHAPTER SEGMENTATION | "NONE"/"PAGE BREAK"/ "PAPER CHANGE" • "PAPER CHANGE" IS FIXED WHEN INDEX PAPER OR INSERTING PAPER IS DESIGNATED.<br>• "PAPER CHANGE" IN SINGLE-SIDED PRINTING |
| 15 | PAGE REPEAT PRINTING | DESIGNATION OF PAGE REPEAT PRINTING • 2-TIME PAGE REPEAT PRINTING, 4-TIME PAGE REPEAT PRINTING, OR NO DESIGNATION OF PAGE REPEAT PRINTING |

FIG. 5

| NO | ATTRIBUTE INFORMATION | VALUES | CONTENTS |
|---|---|---|---|
| 1 | PAPER SIZE | DOCUMENT SIZE/FIXED SIZE | • "PAPER CHANGE" IS AUTOMATICALLY DESIGNATED WHEN FIXED SIZE IS SELECTED.<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK. |
| 2 | PAPER ORIENTATION | PORTRAIT/LANDSCAPE | • SELECTABLE ONLY FOR FIXED SIZE |
| 3 | N-up PRINTING DESIGNATION | NUMBER OF PAGES/ LAYOUT ORDER/ BORDER LINE/ LAYOUT POSITION, ETC. | • LAYOUT POSITION: NINE PATTERNS<br>• X1 PRINTING CAN BE DESIGNATED. |
| 4 | ENLARGEMENT/ REDUCTION | ON / OFF | • ON/OFF CAN BE AUTOMATICALLY DESIGNATED WHEN PAPER SIZE IS FIXED SIZE OR N-up PRINTING IS SELECTED. |
| 5 | WATERMARK | DISPLAY/NON-DISPLAY | • WHETHER TO DISPLAY ALL WATERMARKS DESIGNATED BY BOOK IS DESIGNATED. |
| 6 | HEADER/FOOTER | DISPLAY/NON-DISPLAY | • WHETHER TO DISPLAY ALL HEADERS/FOOTERS DESIGNATED BY BOOK IS DESIGNATED. |
| 7 | DELIVERY METHOD | STAPLING | • STAPLING CAN BE SET OFF WHEN STAPLING IS DESIGNATED BY BOOK. DEFAULT VALUE IS "ON". |

FIG. 6

| NO | ATTRIBUTE INFORMATION | VALUES | CONTENTS |
|---|---|---|---|
| 1 | PAGE ROTATION DESIGNATION | | · 0°/90°/180°/270° CAN BE DESIGNATED. |
| 2 | WATERMARK | DISPLAY/NON-DISPLAY | · WHETHER TO DISPLAY ALL WATERMARKS DESIGNATED BY BOOK IS DESIGNATED. |
| 3 | HEADER/FOOTER | DISPLAY/NON-DISPLAY | · WHETHER TO DISPLAY ALL HEADERS/FOOTERS DESIGNATED BY BOOK IS DESIGNATED. |
| 4 | ZOOM | 50%–200% | · MAGNIFICATION RATIO RELATIVE TO SIZE WHICH IS FIT IN VIRTUAL LOGICAL PAGE REGION AND SET AS 100% IS DESIGNATED. |
| 5 | LAYOUT POSITION | | · NINE FIXED PATTERNS, ARBITRARY POSITION IS DESIGNATED. |
| 6 | ANNOTATION | | |
| 7 | VARIABLE ITEM | | |
| 8 | PAGE SEPARATION | | |

LAYOUT FOR (4-TIME) PAGE REPEAT PRINTING

PAGE REPEAT PRINTING : OFF

FIG. 15

| 1501<br>BASIC SIZE OF LAYOUT | 1502<br>PAPER SIZE IN 2-TIME PAGE REPEAT PRINTING | 1504<br>PAPER SIZE IN 4-TIME PAGE REPEAT PRINTING |
|---|---|---|
| A5 | A4 | A3 |
| A4 | A3 | × |
| B5 | B4 | × |
| POSTCARD | × | DOUBLE POSTAL CARD |
| Letter | 11×17 | × |
| STATEMENT | Letter | 11×17 |
| | OTHERS | |
| W*H | 2W*H / W*H | 2W*2H |

LAYOUT WHEN RIGHT PAGE IS INVERSED

LAYOUT WHEN LEFT PAGE IS INVERSED

PAGE REPEAT PRINTING : OFF

FIG. 19

DETAILED SETTING FOR DOCUMENT

| PAGE SETUP | FINISHING | EDIT | PAPER FEED | PRINT QUALITY |

PRINTING METHOD(Y):
1901
- ● SINGLE-SIDED PRINTING
- ○ DOUBLE-SIDED PRINTING
- ○ BOOKBINDING PRINTING

PAGE REPEAT PRINTING(X): [A|A] 2-TIME PAGE REPEAT PRINTING ▶

1902

BINDING DIRECTION(B): [A|A] LONG-SIDE BINDING ▶

BINDING WIDTH(G): 0 ▲▼ mm (0~30)

ADJUST DOCUMENT(J):
- ● REDUCE IN ACCORDANCE WITH PRINTING REGION SET BY MARGIN
- ○ MOVE IN ACCORDANCE WITH BINDING WIDTH

DETAILED SETTING (PORT) ▶

DESIGNATE STAPLING(S): NONE ▶

STAPLING POSITION(I): ☐ UPPER LEFT (ONE PORTION) ▶

☐ PUNCH HOLE(N)
☐ Z-FOLD(Z)

SEGMENT CHAPTER(X): NOT DESIGNATE ▶

[ OK ]  [ CANCEL ]  [ RESTORE TO LATEST SAVE STATE (V) ]
[ APPLY (A) ]  [ HELP (H) ]

FIG. 21

| PAPER ORIENTATION \ PAGE REPEAT PRINTING | NONE | 2-TIME PAGE REPEAT PRINTING | 2-TIME PAGE REPEAT PRINTING + HEAD/TAIL CUT EDGE | 2-TIME PAGE REPEAT PRINTING + LEFT/RIGHT CUT EDGE | 4-TIME PAGE REPEAT PRINTING |
|---|---|---|---|---|---|
| PORTRAIT | A | 2101 A\|A | 2102 A\|∀  2103 ∀\|A | | 2104 A\|A / A\|A |
| LANDSCAPE | A | 2105 A\|A | | 2106 A\|∀  2107 ∀\|A | 2108 A\|A / A\|A |

F I G. 22
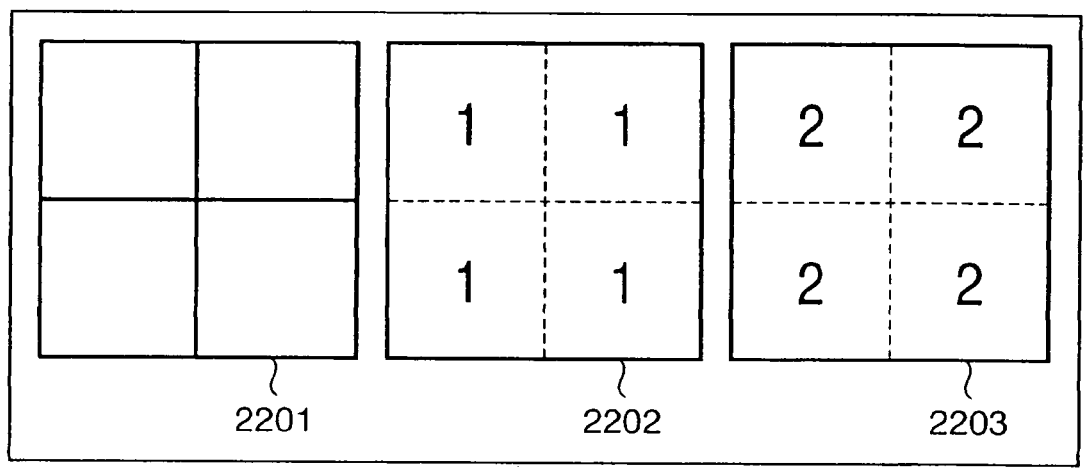

FIG. 23

DETAILED SETTING FOR DOCUMENT — 2301

| PAGE SETUP | FINISHING | EDIT | PAPER FEED | PRINT QUALITY |

OUTPUT PAPER SIZE(S) : [ A4 ▼ ]

☑ ENLARGE/REDUCE DOCUMENT IN ACCORDANCE WITH OUTPUT PAPER SIZE(E)

ORIENTATION OF OUTPUT PAPER(T) : [A ▼]  ○ PORTRAIT   ⦿ LANDSCAPE

PAGE LAYOUT(L) : [ 2 PAGES PER SHEET ▼ ]

ORDER(O) : [ FROM LEFT TO RIGHT ▼ ]

BORDER LINE(B) : [ NONE ▼ ]

☐ ENLARGE/REDUCE DOCUMENT IN ACCORDANCE WITH MARGIN(F)

ARRANGE DOCUMENT(Z) : [ CANTER ▼ ]

[ MARGIN/HEADER/HOOTER POSITION(M)... ]   [ RESTORE TO LATEST SAVE STATE(V) ]

[ OK ]   [ CANCEL ]   [ APPLY(A) ]   [ HELP(H) ]

2-TIME PAGE REPEAT PRINTING

PAGE REPEAT PRINTING : OFF

DOCUMENT PROCESSING APPARATUS AND METHOD

FIELD OF THE INVENTION

The present invention relates to a document processing apparatus and document processing method which provide a document editing function in a system having a printer and an information processing apparatus such as a personal computer. In particular, the document editing function provided by the document processing apparatus and method includes a function of combining output data generated by various programs such as a document processing program and image editing application into one document.

BACKGROUND OF THE INVENTION

Various application programs are needed in accordance with the data types because different data types such as text, tables, and images require different structures for defining these data and different editing operations for these data. The user must use different applications for different data types: a word processing program for editing of texts, a spreadsheet program for editing of tables, and an image editing programs for editing of images.

The user generally uses an application program corresponding to each data type. However, a document to be created by the user is not usually a document made up of only one type of data such as only text, tables, or images, but a document made up of a plurality of data types such as text and tables or characters and images. In order to create a target document containing a plurality of data types, the user utilizes the print functions of various applications, prints data by using the applications, and manually combines printed materials into a desired order.

A program called "Office Suite", which forms one integrated application from various applications, provides a function of combining data generated by respective applications into one document. The use of the integrated application allows the user to combine data created by respective applications into one target document by using a specific application included in the integrated application.

There is proposed a document processing system which holds data for each page, and lays out and prints data on a paper sheet in accordance with various setting values. In this system, data are held within a hierarchical structure, but setting values are held for only an entire document, thus partial settings are impossible. For example, there is a printing system capable of layout setting (to be referred to as N-page printing, Nin1 printing, or N-page layout) of arranging N pages (N is, e.g., two, four, nine, or 16) on one surface of one sheet of a document created by an application program or the like. Taking N-page printing as an example, 2-page printing can be set for an entire document, but part of the document having the 2-page printing designation cannot be changed to 4-page printing. That is, one setting item cannot be set to a setting value different from that of an entire document for part of the document. In a system capable of setting the layout and the like for each part of a document, attributes (setting values of the layout and the like) are held for only each part, and cannot be simultaneously changed at once throughout the entire document.

In this environment, a document processing system has been introduced in which document data are hierarchically held as a page, a set of pages, or an entire document, and the values of various setting items are also held for each layer of the document data (see Japanese Patent Laid-Open No. 2003-162404). This system can realize both a single setting for an entire document and partial settings for parts of the document.

As an editing operation, this system can change the setting value of each setting item, and can also move, copy, and paste an arbitrary unit such as a page or a set of pages within or outside a document. This system also has a function of previewing the state of document data at the end of a printing process, presenting the preview display to the operator, and prompting him to perform editing operations. In the document processing system, when a document is output (e.g., displayed or printed), each page within the document is output in a format corresponding to settings of the entire document and the settings of each page. Setting contents include a setting for printing different pages on one sheet, like N-page printing, and a page repeat printing function of copying the same page a number of times on one sheet, and displaying and printing the result. A layout implemented by this page repeat printing function will be called a page repeat layout.

Page repeat printing (page repeat layout) is a function premised on cutting after printing. Page repeat printing is a function of laying out the same page by a number of times on one paper sheet and printing the result in order to output the printed results of copies on one paper sheet. Most page repeat printing functions output a printed material so as to obtain an original page by simply equally cutting a paper sheet instead of cutting a paper sheet into an arbitrary page size with a register mark. For document data in which N-page printing and the page repeat layout are simultaneously set, the cut line is confusing during post printing editing and cutting.

An error occurs when the preview display of document data having the page repeat layout setting enables page selection and an editing process for respective images of identical pages which are laid out on one sheet surface. This is because identical pages laid out on one sheet in the page repeat layout do not exist as entities in document data but are merely copies for printing. This is different from the preview display of a general N-page printing layout. In editing a document, the page repeat layout setting must be canceled, or even if the page repeat layout is set, a document must be previewed as if no page repeat layout were set.

In the document processing system which permits the page repeat layout setting, the productivity decreases in outputting a document having the page repeat layout. The operability of editing operations is poor for a document having the page repeat layout. Further, it is difficult to accurately express the format of an actual output material of a document having the page repeat layout setting on the preview display. This also leads to poor operability of the editing operation and low productivity.

SUMMARY OF THE INVENTION

The present invention has been made to overcome the above drawbacks, and has as its object to provide a document processing apparatus and method capable of confirming both the layout of document pages and the printing layout as a preview in creating a page repeat printing material which outputs the printed results of copies on one paper sheet.

It is another object of the present invention to provide a document processing apparatus and method capable of implementing high-visibility preview display of a printed result for a document having the page repeat printing layout setting.

It is still another object of the present invention to provide a document processing apparatus and method capable of creating a printed material in which a document is easily laid out by only preparing a document of a page when a printed material having the page repeat layout is to be created.

It is still another object of the present invention to easily execute single-sided/double-sided printing control, imposition control for the N-page printing layout, and editing control in the preview display mode in editing a document having the page repeat layout.

To achieve the above objects, a document processing apparatus according to the present invention has the following arrangement. That is, a document processing apparatus capable of editing an output format of document data formed from a document page comprises page repeat layout setting save means for saving page repeat layout setting information designated by a user, generation means for, when a page repeat layout is set by the page repeat layout setting information, generating output document data containing a page repeat printing page prepared by laying out a basic page by a number of times on one print page in accordance with the page repeat layout setting information by defining as the basic page one print page used when no page repeat layout is set, and display control means for displaying the document data in a print form in a display window on the basis of the output document data.

According to the present invention, both the layout of document pages and the printing layout can be confirmed as a preview in creating a page repeat printing material which outputs the printed results of copies on one paper sheet.

Further, high-visibility preview display of a printed result can be implemented for a document having the page repeat printing layout setting.

When a printed material having the page repeat layout is to be created, a printed material can be created in which a document is easily laid out by only preparing a document of a page.

Single-sided/double-sided printing control, imposition control for the N-page printing layout, and editing control in the preview display mode can be easily executed in editing a document having the page repeat layout.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A is a view schematically showing an example of a book file format;

FIG. 3B is a view showing the structure of document data;

FIG. 4A is a table showing an example of book attributes according to the embodiment;

FIG. 4B is a table showing an example of book attributes according to the embodiment;

FIG. 5 is a table showing an example of chapter attributes according to the embodiment;

FIG. 6 is a table showing an example of page attributes according to the embodiment;

FIG. 15 is a table showing an example of the relationship between the document page size and the output paper size in page repeat printing in the document processing system according to the embodiment;

FIG. 19 is a view showing an example of a page repeat printing setting window in the document processing system according to the embodiment;

FIG. 21 is a table showing an example of layout preview display when page repeat printing is set in the document processing system according to the embodiment;

FIG. 22 is a view showing an example when a printing designation paper sheet is added and output in page repeat printing in the document processing system according to the embodiment;

FIG. 23 is a view showing an example of a layout setting window for setting N pages in the document processing system according to the embodiment;

DETAILED DESCRIPTION OF THE PREFERRED EMBODIMENTS

Preferred embodiments of the present invention will be described in detail below with reference to the accompanying drawings.

<Outline of System>

The outline of a document processing system according to the present invention will be described with reference to FIGS. 1 to 12. The document processing system includes an electronic document writer which converts a data file created by a general application into an electronic document file, and a bookbinding application which provides a function of editing the electronic document file. The document processing system enables creation and editing of a document containing created data, improves the operability, and efficiently edits a document.

<Configuration and Operation of System>

Figure 1:
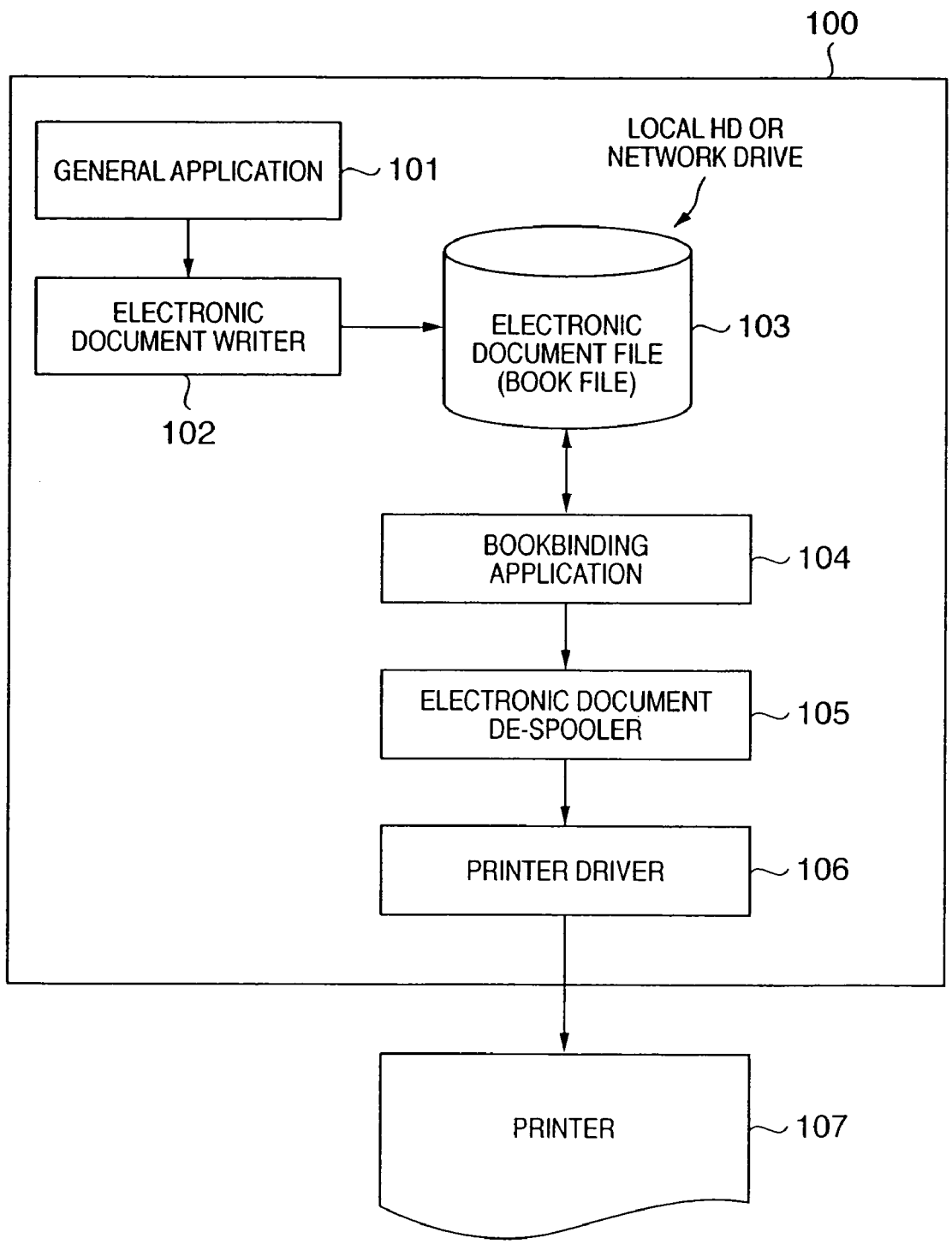
FIG. 1 is a block diagram for explaining the configuration of a stand alone document processing system according to an embodiment of the present invention.

FIG. 1 is a block diagram showing the software configuration of the document processing system according to the embodiment. The document processing system is implemented by a digital computer 100 (to be also referred to as a host computer hereafter) as a suitable embodiment of an information processing apparatus according to the present invention. A general application 101 shown in FIG. 1 is an application program which provides functions such as word-processing, spreadsheet, photo-retouch, draw, paint, presentation, and text editing. The general application 101 has a printing function for the OS (Operating System). Such applications utilize a predetermined interface (generally called GDI) provided by the OS in printing application data such as created document data or image data. To print created data, the application 101 transmits an output command (called a GDI function) which is determined in advance for the output module of the OS providing the interface and has an OS-dependent format. The output module receives the output command, converts the output command into a format processible by an output device such as a printer, and outputs the converted command (called a DDI function). Since the format processible by the output device changes depending on the type of device, the manufacturer, and the model, a device driver is provided for each device. The OS converts a command by using the device driver to generate print data, and combines the print data by JL (Job Language) to generate a print job. When the OS is Microsoft Windows®, the output module is a GDI (Graphical Device Interface) module.

An electronic document writer 102 is an improvement of the above-mentioned device drivers, and is a software module provided to implement the document processing system. The electronic document writer 102 does not target a specific output device, and generates an output command of a format processible by a bookbinding application 104 or printer driver 106 (to be described in detail later). The format (to be referred to as an "electronic document format" hereinafter) converted by the electronic document writer 102 is not particularly limited as far as each document page can be expressed by a detailed format. Of substantial standard formats, for example, the PDF format by Adobe Systems and the SVG format can be adopted as electronic document formats.

When the general application 101 utilizes the electronic document writer 102, the electronic document writer 102 is designated as a device driver used for output, and then caused to execute printing. An electronic document file created by the electronic document writer 102 does not have a complete electronic document file format. For this reason, the electronic document writer 102 is designated as a device driver by the bookbinding application 104, and executes conversion of application data into an electronic document file under the management of the bookbinding application 104. The bookbinding application 104 completes a new incomplete electronic document file generated by the electronic document writer 102 as an electronic document file having the following format. In case of necessity to definitely discriminate these files, a file created by the electronic document writer 102 will be called an "electronic document file", and an electronic document file given a structure by the bookbinding application will be called a "book file". If these files need not be particularly discriminated, a document file generated by an application, an electronic document file, and a book file are called document files (or document data).

As described above, the electronic document writer 102 is designated as a device driver, and the general application 101 prints the data. Application data is converted into an electronic document format in pages (to be referred to as "logical pages" or "document pages" hereinafter) defined by the application 101. The converted data is stored as an electronic document file 103 in a storage medium such as a hard disk. The hard disk may be the local drive of the computer which implements the document processing system according to the embodiment, or when the computer is connected to a network, may be a drive provided on the network.

The bookbinding application 104 provides the user with a function of reading and editing the electronic document file (or book file) 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates an electronic document de-spooler 105. The electronic document de-spooler 105 is a program module which is installed in the computer together with the bookbinding application. The electronic document de-spooler 105 is used to output drawing data to a printer driver in printing a document (book file) used by the bookbinding application. The electronic document de-spooler 105 reads out a designated book file from the hard disk. To print each page in a format described in the book file, the electronic document de-spooler 105 generates an output command complying with the output module of the OS described above, and outputs the command to the output module (not shown). At this time, the driver 106 for a printer 107 used as an output device is designated as a device driver. The above-described output module converts the received output command into a device command, and outputs the device command to the designated printer driver 106 for the printer 107. The device driver 106 converts the device command into a command such as a page description language interpretable by the printer 107. The converted command is transmitted from the printer driver 106 to the printer 107 via a system spooler (not shown), and the printer 107 prints an image corresponding to the command.

Figure 2:
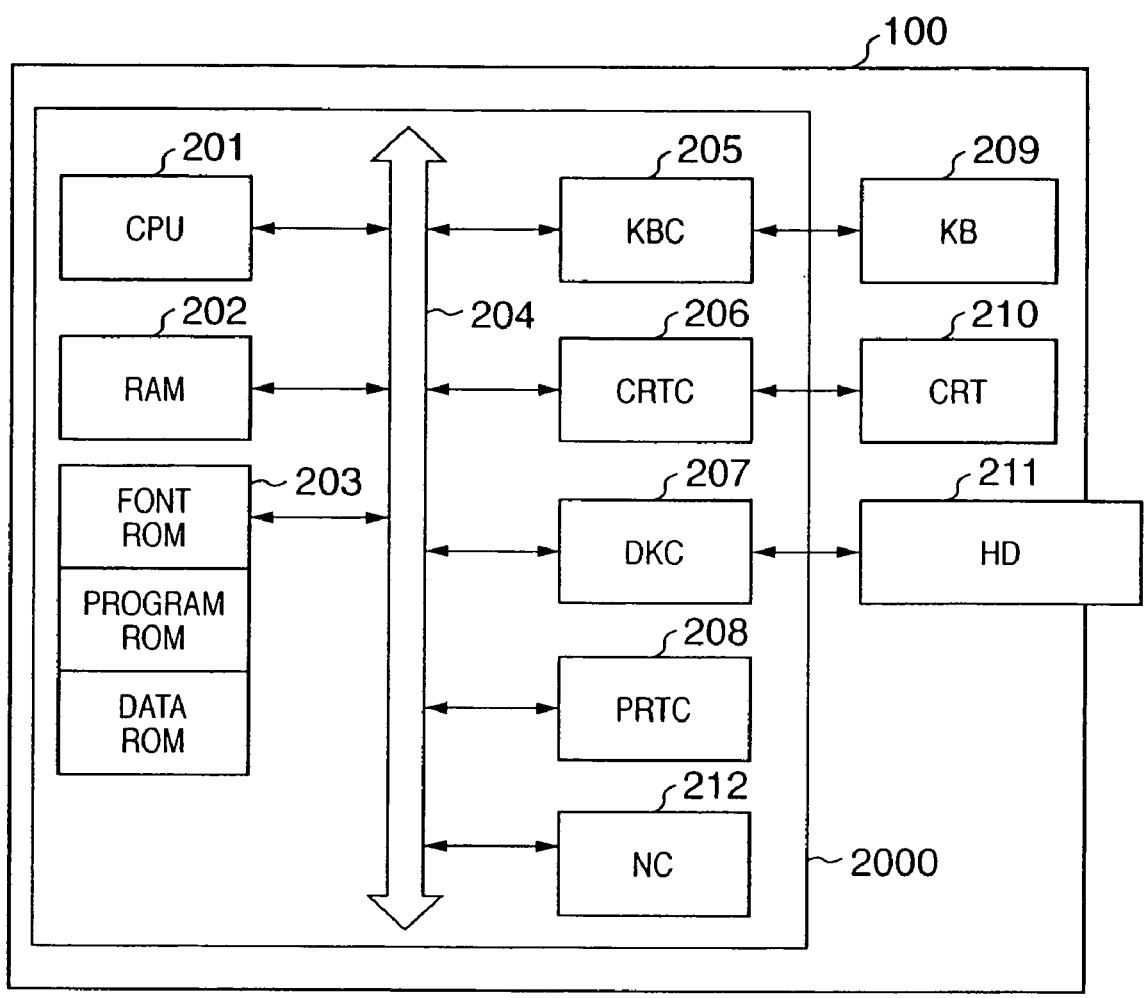
FIG. 2 is a block diagram showing the configuration of a host computer which implements the document processing system according to the embodiment.

FIG. 2 is a block diagram showing the hardware of the computer 100. In FIG. 2, a CPU 201 executes a program such as an OS, general application, or bookbinding application which is stored in the program ROM of a ROM 203 or loaded from a hard disk 211 to a RAM 202, and implements the software configuration in FIG. 1 or the sequence of a flowchart (to be described later). A RAM 202 functions as a main memory, work area, or the like for the CPU 201. A keyboard controller (KBC) 205 controls a key input from a keyboard 209 or a pointing device (not shown). A CRT controller (CRTC) 206 controls the display of a CRT display 210. A disk controller (DKC) 207 controls access to the hard disk (HD) 211, flexible disk (FD), or the like which stores a boot program, various applications, font data, user files, edited files (to be described later), and the like. A PRTC 208 controls exchange of signals with the connected printer 107. An NC 212 is connected to a network, and executes a communication control process with another device connected to the network.

<Format of Electronic Document Data>

Before referring to details of the bookbinding application 104, the data format of a book file will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may contain a plurality of chapters, and one chapter may contain a plurality of pages.

FIG. 3A is a view schematically showing an example of the book file format. In this example, as shown in FIG. 3A, a book, chapter, and page in the book file are represented by corresponding nodes. One book file contains one book. The book and chapter are a concept for defining a book structure, and contain, as entities, defined attribute values and links to lower layers. The page has, as entities, data of each page output from an application program. The page contains a document page entity (document page data) and a link to each document page data in addition to an attribute value.

Note that a print page to be output to a paper medium may contain a plurality of document pages. This structure is displayed not by a link, but by attributes in book, chapter, and page layers.

In FIG. 3A, a book 301 defines a book attribute, and is linked to two chapters 302A and 302B. These links indicate that the chapters 302A and 302B are contained in the book 301. The chapter 302A is linked to pages 303A and 303B, which represents that these pages are contained in the chapter 302A. The pages 303A and 303B define attribute values, and contain links to document page data (1) and (2) serving as entities. These links point to data (1) and (2) of document page data 304, as shown in FIG. 3B, and indicate that the entities of the pages 303A and 303B are document page data (1) and (2).

FIGS. 4A and 4B show a list of book attributes. As for an item which can be defined repetitively on a lower layer, the attribute value of the lower layer is preferentially adopted. As for an item contained in only the book attribute, a value defined in the book attribute is effective throughout the book. An item repetitively defined on a lower layer is a default value used when this item is not defined in the lower layer. Each item shown in FIGS. 4A and 4B does not correspond to one concrete item, but may contain a plurality of relevant items.

FIG. 5 shows a list of chapter attributes, and FIG. 6 shows a list of page attributes. The relationship between the chapter attribute and the page attribute is the same as that between the book attribute and the lower layer attribute.

As is apparent from FIGS. 4A to 6, items unique to the book attribute are seven items: printing method, details of bookbinding, front/back cover, index paper, inserting paper, chapter segmentation, and page repeat printing (page repeat layout). These items are defined throughout the book. As the printing method attribute, three values, i.e., single-sided printing, double-sided printing, and bookbinding printing can be designated. Bookbinding printing is a method of printing in a format which allows bookbinding by bundling a separately designated number of paper sheets, folding the bundle into two, and binding the bundle. As the detailed bookbinding attribute, the opening direction and the number of paper sheets to be bundled can be designated when bookbinding printing is designated.

The front/back cover attribute includes designation of adding paper sheets serving as front and back covers when an electronic document file combined as a book is printed, and designation of contents to be printed on the added paper sheets. The index paper attribute includes designation of inserting tabbed index paper separately prepared in a printing apparatus for chapter segmentation, and designation of contents to be printed on the index (tabbed) portion. This attribute becomes effective when a printing apparatus for use is equipped with an inserter having an inserting function of inserting a paper sheet prepared separately from a print sheet into a desired position, or when a plurality of sheet cassettes can be used. This also applies to the inserting paper attribute.

The inserting paper attribute includes designation of inserting a paper sheet fed from an inserter or sheet feed cassette for chapter segmentation, and designation of a sheet feed source when inserting paper is inserted.

The chapter segmentation attribute includes designation of whether to use a new paper sheet, use a new print page, or do nothing particular at a chapter break. In single-sided printing, the use of a new paper sheet and the use of a new print page are the same. In double-sided printing, successive chapters are not printed on one paper sheet if "the use of a new paper sheet" is designated, but may be printed on the obverse and reverse of one paper sheet if "the use of a new print page" is designated.

The page repeat layout setting includes two settings "page repeat printing method" and "cut edge selection". The page repeat printing method includes one of at least three setting values "2-time page repeat layout", "4-time page repeat layout", and "no page repeat layout setting. The "2-time page repeat layout" is a layout of laying out one document page by two times on one surface (i.e., a print page) of one sheet. Output materials of two pages can be obtained from one sheet by cutting the sheet at a center line in the longitudinal direction. This method is more advantageous in printing time than printing of document pages one by one. In addition, this method can reduce the maintenance cost in a maintenance system which charges the user for each sheet. The "4-time page repeat layout" is a layout of laying out one document page by four times on one print page. Output materials of four pages can be obtained from one sheet by cutting the sheet at center lines along respective sides. In the page repeat layout, one document page is laid out on one print page without magnifying the page, unlike the N-up (N-page) layout in which different document pages are reduced and laid out on one sheet. Hence, the sheet size is two times larger than the document page size in the 2-time page repeat layout, and four times larger in the 4-time page repeat layout.

Especially when the "2-time page repeat layout" is set as the page repeat layout setting, the orientation of a document page laid out on one print page can be designated by "cut edge selection". This designation includes designation of a side along which the cut line of a document page is set. For example, for "head", a document page is laid out so that the head of an erect document page is set as a cut line. For "tail", a document page is laid out so that the tail of an erect document page is set as a cut line. For "right", a document page is laid out so that the right side of an erect document page is set as a cut line. For "left", a document page is laid out so that the left side of an erect document page is set as a cut line. The relationship between the head and tail and that between the right and left are determined by the sheet orientation. It suffices that a side for the cut line can designate "head or right" or "tail or left", and similarly "head or left" or "tail or right".

As described above, the page repeat layout setting includes page repeat method information for setting the page repeat layout, and cut edge selection information for designating the orientation of a document page laid out on one sheet. The page repeat layout is not limited to the 2-time page repeat layout or 4-time page repeat layout, but a document page can also be laid out on a sheet having powers of 2 of the side length such as an 8-time page repeat layout or 16-time page repeat layout, or an integer multiple of a side length such as a 9-time page repeat layout. In the embodiment, the page repeat layout is the 2-time page repeat layout or 4-time page repeat layout.

As for the chapter attribute, there is no item unique to the chapter, and all items overlap those of the book attribute. If the definition of the chapter attribute is different from that of the book attribute, a value defined by the chapter attribute precedes. Items common to only the book and chapter attributes are five items: paper size, paper orientation, N-up printing designation, enlargement/reduction, and delivery method. Among them all, these items, the N-up printing designation attribute is an item for designating the number of document pages contained in one print page. Layouts which can be designated are 1×1, 1×2, 2×2, 3×3, 4×4, and the like. The delivery method attribute is an item for designating whether to staple discharged paper sheets. The effectiveness of this attribute depends on whether a printing apparatus for use has a stapling function.

Items unique to the page attribute are a page rotation attribute, zoom, layout designation, annotation, and page separation. The page rotation attribute is an item for designating the rotation angle when a document page is laid out on a print page. The zoom attribute is an item for designating the variable magnification ratio of a document page. The variable magnification ratio is designated based on a virtual logical page region size=100%. The virtual logical page region is a region occupied by one document page when document pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or text (i.e., character string) printed over data created by an application. The header/footer is a watermark printed at the upper or lower margin of each page. For the header/footer, items such as a page number, and time and date which can be designated by variables are prepared. Contents which can be designated by the watermark attribute and header/footer attribute are common between the chapter and the page, but are different from those of the book. The book can set the watermark and header/footer contents, and designate how to print a watermark or header/footer throughout the book. To the contrary, the chapter and page can only designate whether to print a watermark or header/footer set by the book on the chapter or page.

<Book File Generation Sequence>

The book file has the above-described structure and contents. A sequence of creating a book file by the bookbinding application 104 and electronic document writer 102 will be explained. The book file creation sequence is realized as part of book file editing operation by the bookbinding application 104.

Figure 7:
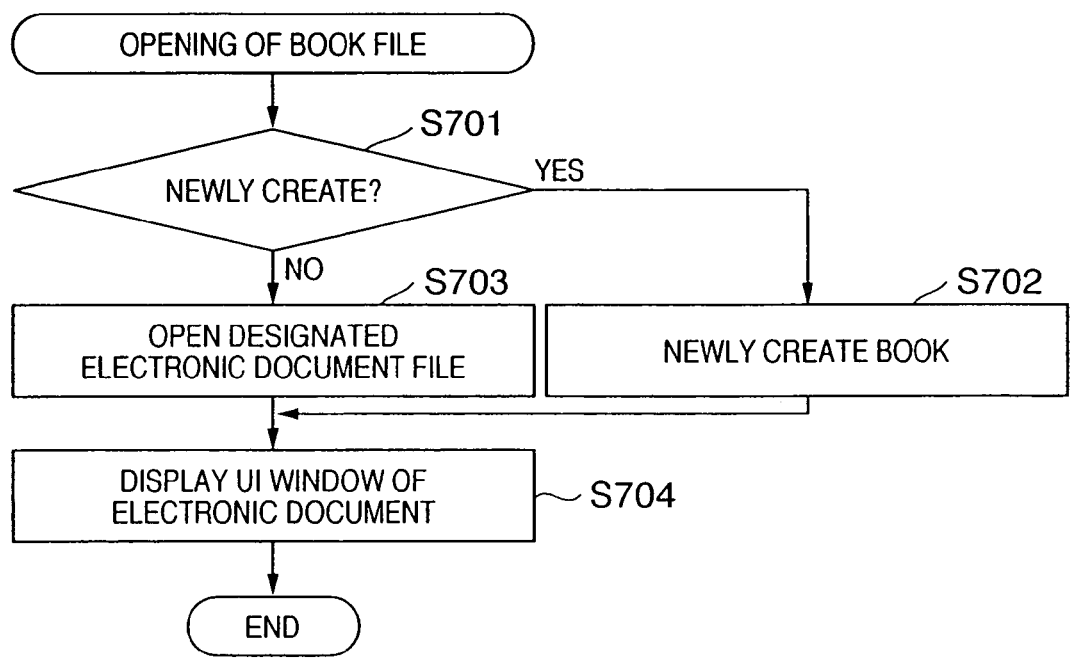
FIG. 7 is a flowchart for explaining a sequence of opening a book file in the document processing system according to the embodiment.
Figure 11:
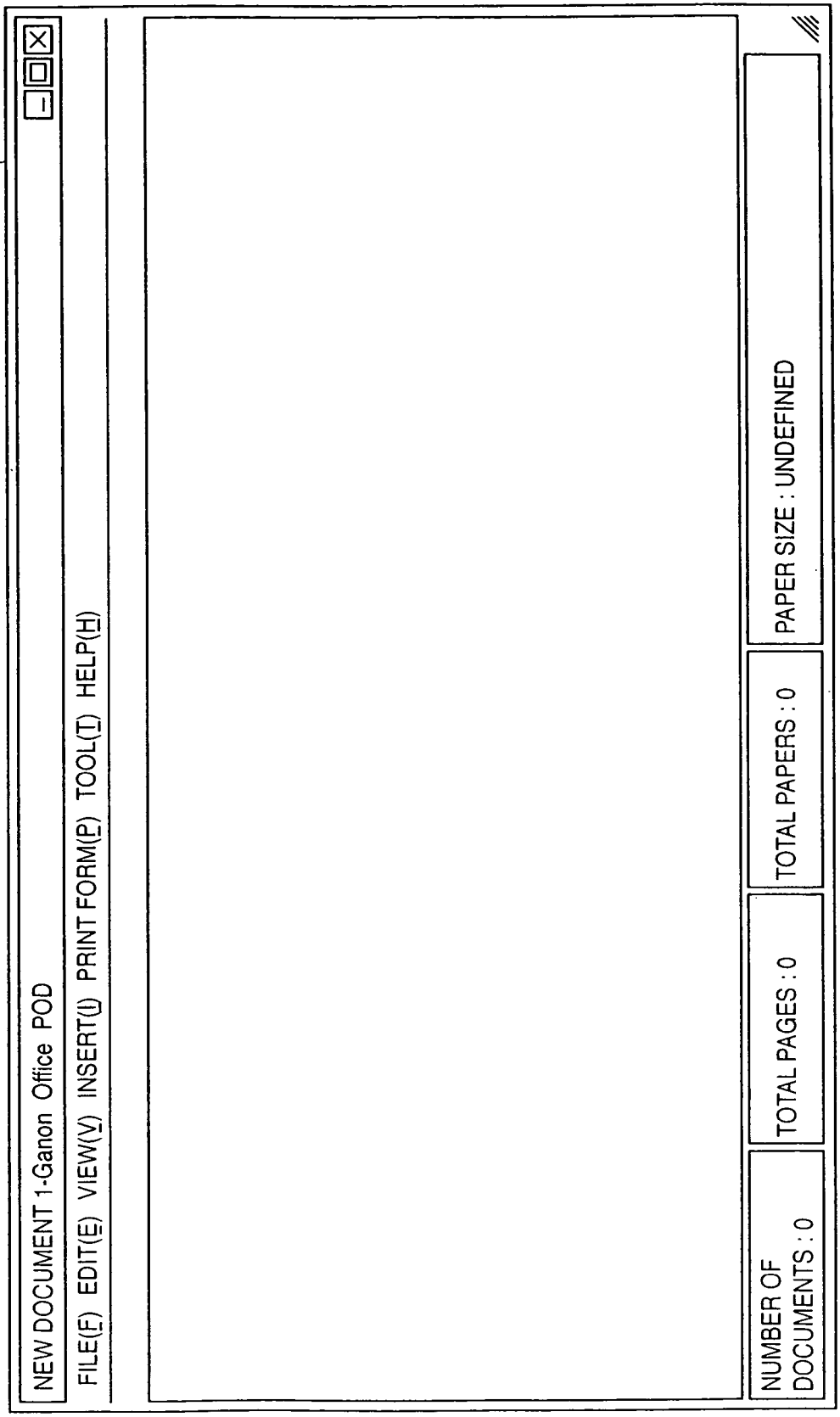
FIG. 11 is a view showing an example of a user interface window when a new book file is opened.

FIG. 7 shows a sequence when the bookbinding application 104 opens a book file. Whether a book file to be opened is one to be newly created or an existing one is determined (step S701). If the book file is one to be newly created, a book file containing no chapter is newly created (step S702). In the example shown in FIG. 3A, the newly created book file has only a book node 301 which does not have any link to a chapter node. Applied book attributes are a set of attributes which are prepared in advance for creation of a new file. A UI (User Interface) window for editing the new book file is displayed (step S704). FIG. 11 shows an example of a UI window when a book file is newly created. In this case, the book file does not have any substantial content, and a UI window 1100 does not display anything.

Figure 10:
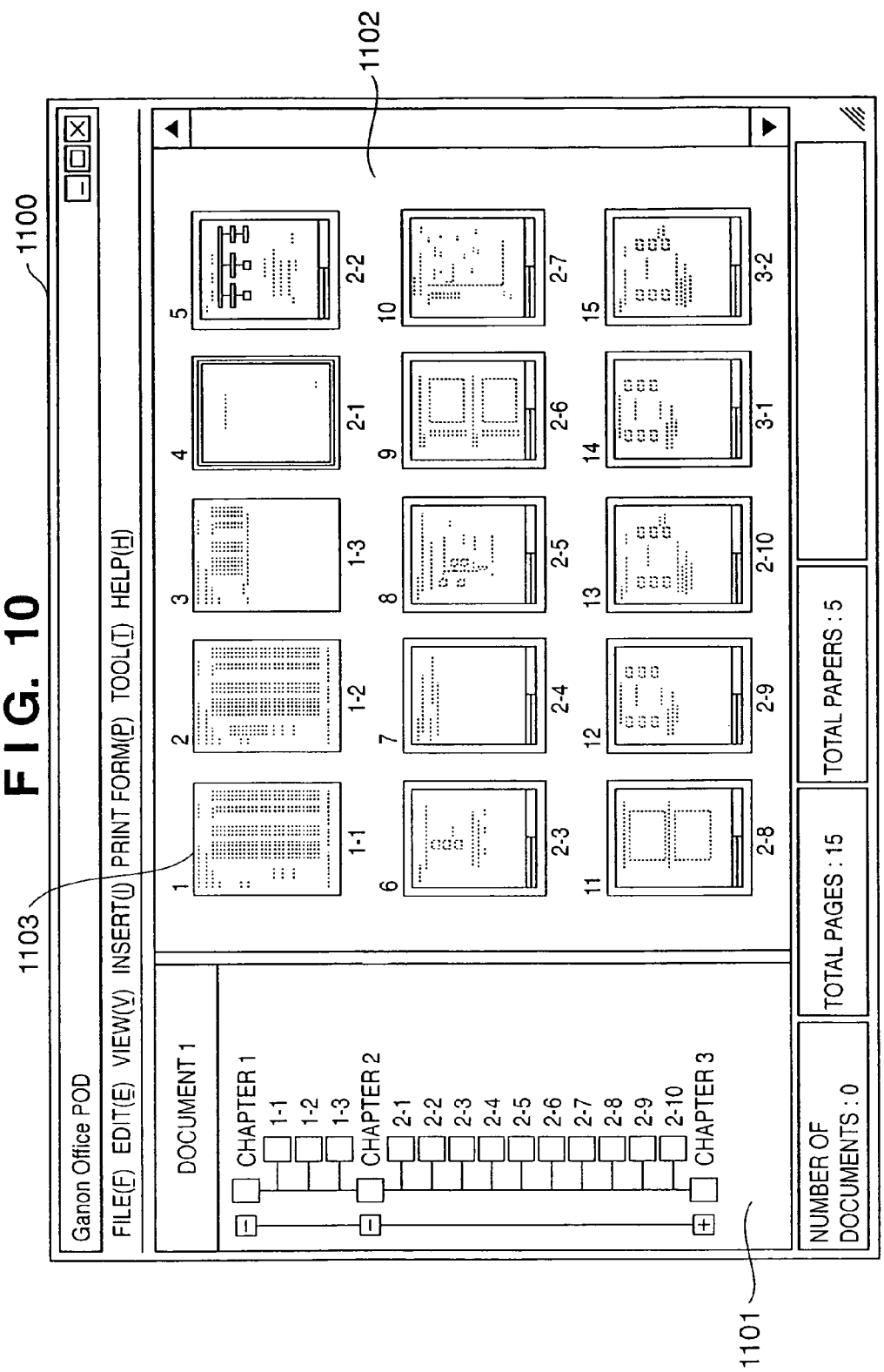
FIG. 10 is a view showing an example of a user interface window when an existing book file is opened.

If the book file is an existing one, a designated book file is opened (step S703), and a UI (User Interface) window is displayed in accordance with the structure, attributes, and contents of the book file. FIG. 10 shows an example of the UI window which displays a designated book file from existing book files. A UI window 1100 has a tree portion 1101 representing a book structure, and a preview portion 1102 displaying a state to be printed. The tree portion 1101 displays chapters contained in the book and pages contained in each chapter with a tree structure as shown in FIG. 3A. Pages displayed at the tree portion 1101 are document pages. The preview portion 1102 displays reduced print page contents. The display order reflects the book structure.

Application data converted into an electronic document file by the electronic document writer 102 can be added as a new chapter to the open book file. This function is called an electronic document import function. The electronic document is imported to the book file newly created by the sequence shown in FIG. 7, giving an entity to the book file. This function is activated by dragging and dropping application data in the window of FIG. 10.

Figure 8:
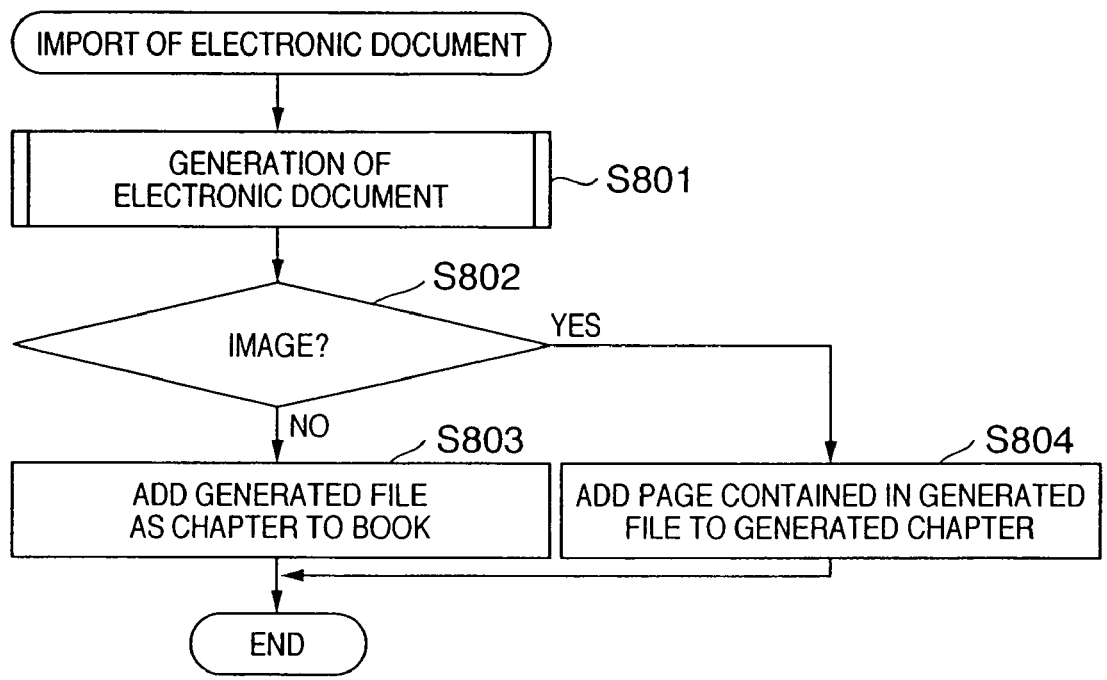
FIG. 8 is a flowchart for explaining a sequence of importing an electronic document file to a book file in the document processing system according to the embodiment.

FIG. 8 shows an electronic document import sequence. An application program which has generated designated application data is activated. The electronic document writer 102 is designated as a device driver, and application data is printed out to convert the data into electronic document data (step S801). After conversion, whether the converted data is image data is determined (step S802). This determination can be done on the basis of the file extension of application data under the Windows® OS. For example, an extension "bmp" represents Windows® bitmap data; "jpg", jpeg-compressed image data; and "tiff", tiff-format image data. Such image data can directly generate an electronic document file without activating any application, unlike S801, and thus the process in S801 can be omitted.

If the data is not image data, the electronic document file generated in step S801 is added as a new chapter to the book of a currently open book file (step S803). As for chapter attributes which are common to book attributes, the values of the book attributes are copied. As for unique chapter attributes, predetermined default values are set.

If the data is image data in step S802, no new chapter is added in principle, and each document page contained in the electronic document file generated in step S801 is added to a designated chapter (step S804). If the book file is a newly created one, a new chapter is created, and each page of the electronic document file is added as a page belonging to the chapter. As for page attributes, attributes common to the attributes of an upper layer are given the attribute values of the upper layer, and attributes which are defined in application data and inherited to an electronic document file are given values defined in the application data. For example, when N-up designation is defined in application data, the page inherits this attribute value. In this way, a new book file is created, or a new chapter is added.

Figure 9:
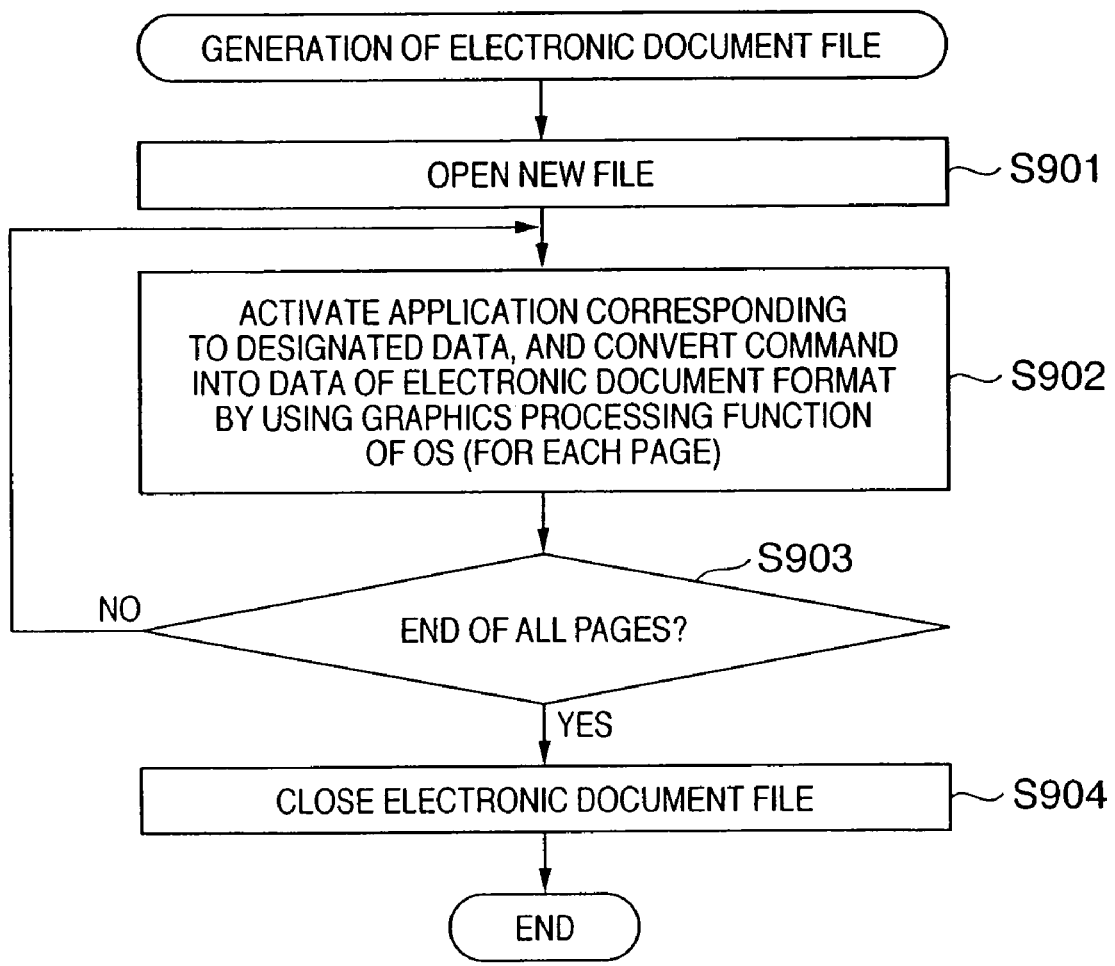
FIG. 9 is a flowchart showing a sequence of converting application data into an electronic document file in the document processing system according to the embodiment.

FIG. 9 is a flowchart showing a sequence of generating an electronic document file by the electronic document writer 102 in step S801 shown in FIG. 8. A new electronic document file is created and opened (step S901). An application corresponding to designated application data is activated. The electronic document writer is set as a device driver to transmit an output command to an OS output module. The output module converts the received output command into data of an electronic document format by the electronic document writer 102, and outputs the converted data (step S902). The output destination is the electronic document file opened in step S901. Whether all designated data have been converted is determined (step S903), and if YES in step S903, the electronic document file is closed (step S904). The electronic document file generated by the electronic document writer 102 is a file containing document page data entities shown in FIG. 3B.

<Editing of Book File>

As described above, a book file can be created from application data. Chapters and pages in the generated book file can be edited as follows.

(1) New document
(2) Delete
(3) Copy
(4) Cut
(5) Paste
(6) Move
(7) Change chapter name
(8) Reassign page number/name
(9) Insert cover
(10) Insert inserting paper
(11) Insert index paper
(12) Page layout of each document page In addition, an operation of canceling executed editing operation, and an operation of restoring canceled operation can be performed. These editing functions enable editing operations such as consolidation of a plurality of editing information files, rearrangement of chapters and pages within a book file, delete of chapters and pages within a book file, layout change of a document page, and insertion of inserting paper and index paper. By these operations, operation results are reflected in attributes shown in FIGS. 4A, 4B, and 5 or in the structures of the book file. For example, a blank page is inserted to a designated portion by an operation of newly adding a blank page. The blank page is processed as a document page. If the layout of a document page is changed, the change contents are reflected in attributes such as the printing method, N-up printing, front/back cover, index paper, inserting paper, and chapter segmentation. "Reflect" means that a changed attribute or the like is saved as a book file.

<Output of Book File>

The ultimate goal of a book file created and edited in the above manner is to print out the file. If the user selects a file menu from the UI window 1100 of the bookbinding application shown in FIG. 10 and selects printing from this menu, the book file is then printed out by a designated output device. At this time, the bookbinding application 104 creates a job ticket from a currently open book file, and transfers the job ticket to the electronic document de-spooler 105. The electronic document de-spooler 105 converts the job ticket into an OS output command, e.g., a Windows® GDI function, and transmits the function to an output module, e.g., GDI. The output module generates a command complying with a device by the designated printer driver 106, and transmits the command to the device.

A job ticket is data having a structure whose minimum unit is a document page. The structure of the job ticket defines the layout of a document page on a paper sheet. One job ticket is issued for one print job. The document node is set at the top of the structure, and defines the attribute of the whole document such as double-sided printing/single-sided printing. This node is accompanied with a paper node containing attributes such as the identifier of paper for use and designation of a feed port in the printer. Each paper node is accompanied with a sheet node which is printed on the paper. One sheet corresponds to one paper sheet. A print page (physical page) belongs to each sheet. One physical page belongs to one sheet in single-sided printing, and two physical pages belong to one sheet in double-sided printing. A document page to be laid out on a physical page belongs to the physical page. The physical page attribute contains a document page layout.

The electronic document de-spooler 105 converts the above-mentioned job ticket into an output command to an output module.

<Another System Configuration>

The outline of the document processing system according to the embodiment has been described. This system is of a stand-alone type. A server-client system as an extension of the stand-alone system can also create and edit a book file by almost the same configuration and sequence. A book file and printing process are managed by the server.

Figure 12:
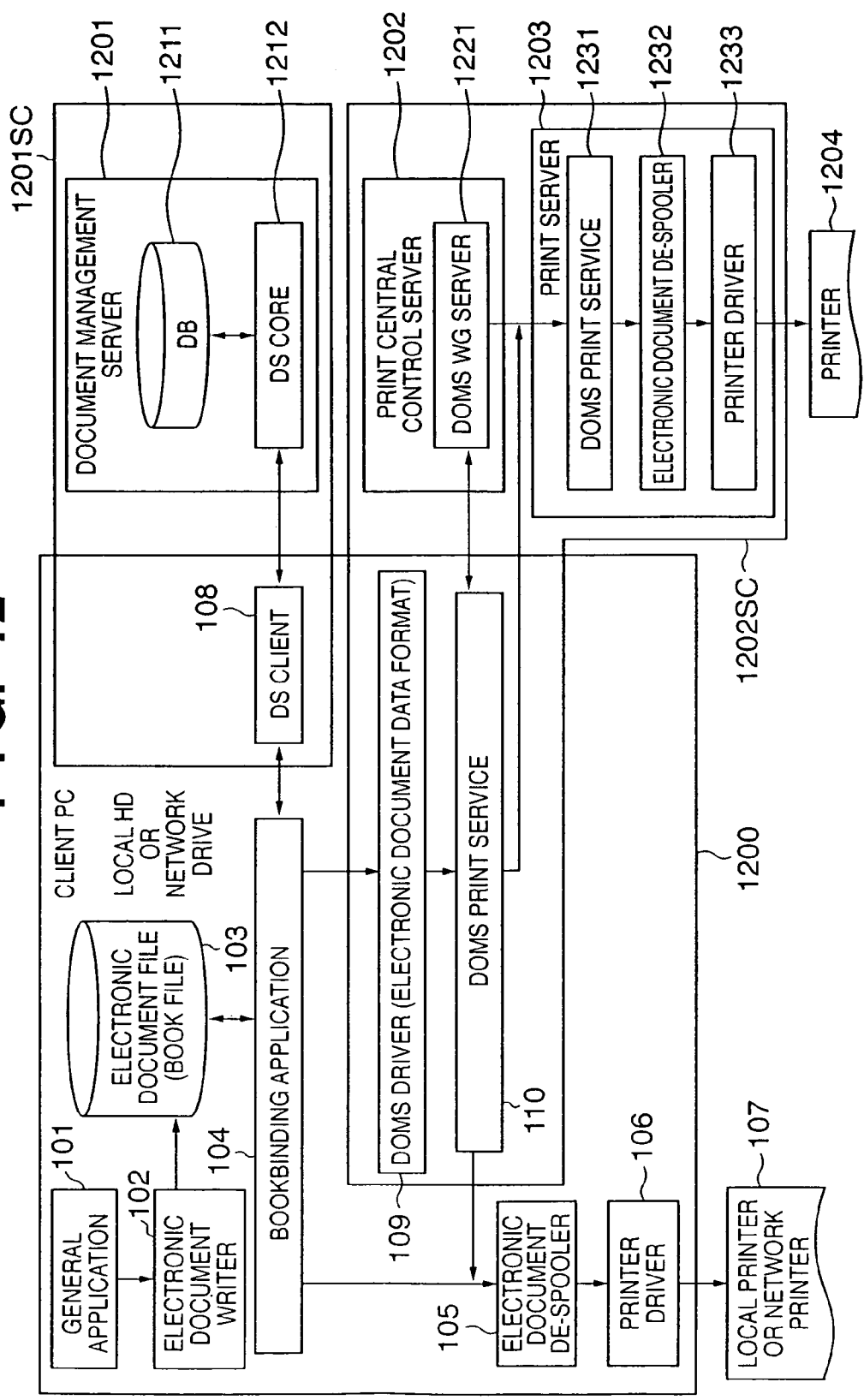
FIG. 12 is a block diagram showing a client-server document processing system in the document processing system according to the embodiment.

FIG. 12 is a block diagram showing the configuration of a server-client document processing system. The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, print central control server 1202, and print server 1203. These servers are generally connected to the client document processing system via a network. When the servers also function as clients, they are connected by interprocess communication which simulates communication between networks.

In the example shown in FIG. 12, the document management server 1201 and print central control server 1202 are connected to the client, but only either one may exist on the network. For example, if the connected server is the document management server, a document management server-client system 1201SC including the client module 108 is added to the stand-alone document management system. If the connected server is the print central control server 1202, a printing management server-client system 1202SC including the client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client 108 and a DS core 1212.

The print central control server 1202 manages printing of a book file stored in the client document processing system 1200 or document management server 1201. A print request from the client is transmitted to a DOMS WG server module 1221 of the print central control server 1202 via the DOMS driver 109 and DOMS print service module 110. To print by the printer of the client, the print central control server 1202 transfers electronic document data to the electronic document de-spooler 105 via the DOMS print service module 110 of the client. To print by the print server 1203, the print central control server 1202 transmits electronic document data to a DOMS print service module 1231 of the print server 1203. For example, the print central control server executes security check on the qualification of a user who has issued a print request for a saved book file, or saves the printing process log. In this fashion, the document processing system can be implemented as both a stand-alone system and client-server system.

<Preview Display Contents>

As described above, when the book file 103 is opened by the bookbinding application 104, the user interface window 1100 shown in FIG. 10 is displayed. The tree portion 1101 displays a tree representing the structure of the open book (to be referred to as a "book of interest" hereinafter). At the preview portion, three display methods are prepared in accordance with designation by the user. The first method is a mode called a document view which directly displays document pages. In the document view mode, the contents of document pages belonging to the book of interest are reduced and displayed. The display of the preview portion 1102 does not reflect any layout. The second method is a printing view mode. In the printing view mode, the preview portion 1102 displays document pages in a format which reflects the layout of the document pages on a sheet. The third method is a simple printing view mode. In the simple printing view mode, the contents of document pages are not reflected in the display of the preview portion, but only the layout is reflected.

<Stapling Control>

Stapling control by the bookbinding application 104 of the computer 100 connected to a printer having a stapling function will be explained.

Figure 13:
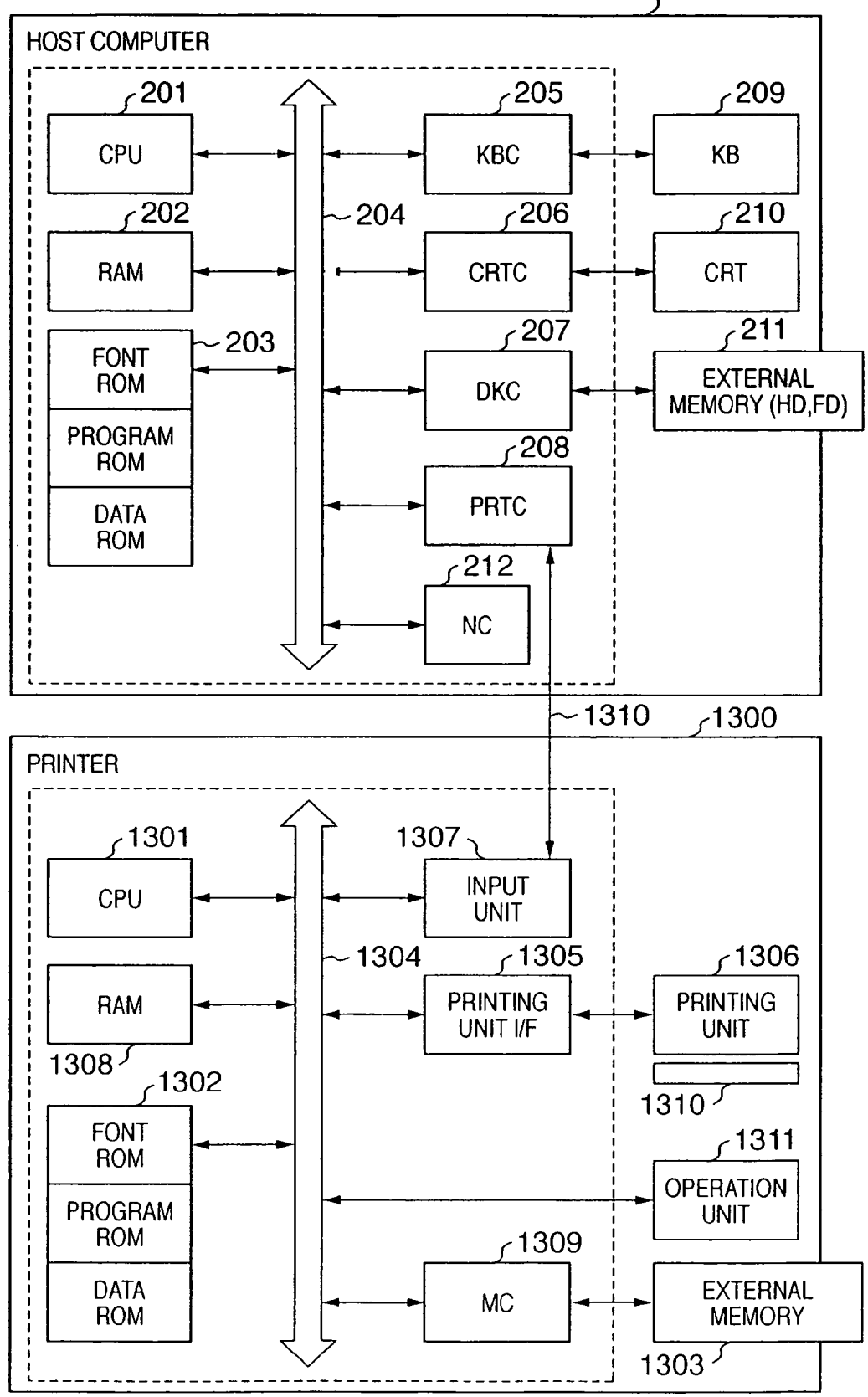
FIG. 13 is a block diagram showing the configuration of a stapling control system.

FIG. 13 is a block diagram showing the configuration of a stapling control system. As shown in FIG. 13, the stapling control system is comprised of the host computer 100 shown in FIG. 2 and a printer 1300 having the stapling function.

The configuration of the printer 1300 will be described. The present invention can be applied to a single device, a system made up of a plurality of devices, or a system which is connected via a network such as a LAN or WAN and performs processes as far as the functions of the present invention are implemented.

As shown in FIG. 13, in the printer 1300, reference numeral 1301 denotes a CPU which outputs an image signal as output information to a printing unit (printer engine) 1306 via a printing unit I/F 1305 connected to a system bus 1304 on the basis of a control program stored in a program ROM within a ROM 1302 or a control program stored in an external memory 1303. The printing unit 1306 is connected to a finisher unit 1310, and the finisher unit 1310 is equipped with a stapler for implementing the stapling function. The finisher 1310 is implemented by a commercially available digital multifunction device.

The program ROM within the ROM 1302 stores, e.g., the control program of the CPU 1301, and a font ROM within the ROM 1302 stores, e.g., font data used to generate the output information. A data ROM within the ROM 1302 stores, e.g., information used in the host computer 100 for a printer having no external memory 1303 such as a hard disk.

The CPU 1301 can communicate with the host computer 100 via an input unit 1307, and notify the host computer 100 of information in the printer 1200 or the like. A RAM 1308 functions as a main memory, work area, or the like for the CPU 1301, and the memory capacity can be expanded by an optional RAM connected to an expansion port (not shown).

The RAM 1308 is used as an output information mapping area, environment data storage area, NVRAM, or the like. Access to the external memory 1303 such as a hard disk (HD) or IC card is controlled by a memory controller (MC) 1309. The external memory 1303 is connected as an option, and stores font data, emulation programs, form data, and the like. An operation panel 1311 is comprised of operation switches, an LED display, and the like.

The number of external memories 1303 is not limited to one, and a plurality of external memories 1303 may be arranged. A plurality of external memories which store an option card and a program for interpreting the printer control languages of different language systems in addition to built-in fonts may be connected. Further, an NVRAM (not shown) may be adopted to store printer mode setting information from the operation panel 1311.

<Page Repeat Layout>

The page repeat layout according to the present invention will be described in detail. As described above, the bookbinding application 104 according to the embodiment can set the attributes of a book, chapter, and page within a book file. The book file has a hierarchical structure as described above with reference to FIGS. 3A and 3B. When the book attribute is set to a given value, the chapter attribute positioned on the lower layer of the book attribute is also changed to the same setting value. Similarly, when the chapter attribute is changed, the page attribute positioned on the lower layer of the chapter attribute is also changed. For example, when the output paper size is set to A4 in the attribute 301 of a book formed from two chapters and four pages as shown in FIG. 3A, the attributes of all the pages contained in the book are changed to the A4 size. When the output paper size is set to A3 in the chapter attribute 302B of FIG. 3A contained in the book attribute, the output paper sizes of page attributes 303C and 303D positioned on the lower layer of the chapter attribute are also changed to A3. At this time, even if the book attribute 301 is changed, the change of the book attribute 301 can be prevented from influencing the chapter attribute 302B and pages on the lower layer of the chapter attribute 302B. In this fashion, all pages on the lower layer are synchronized with the attribute setting (e.g., paper size) of a chapter.

Figure 25:
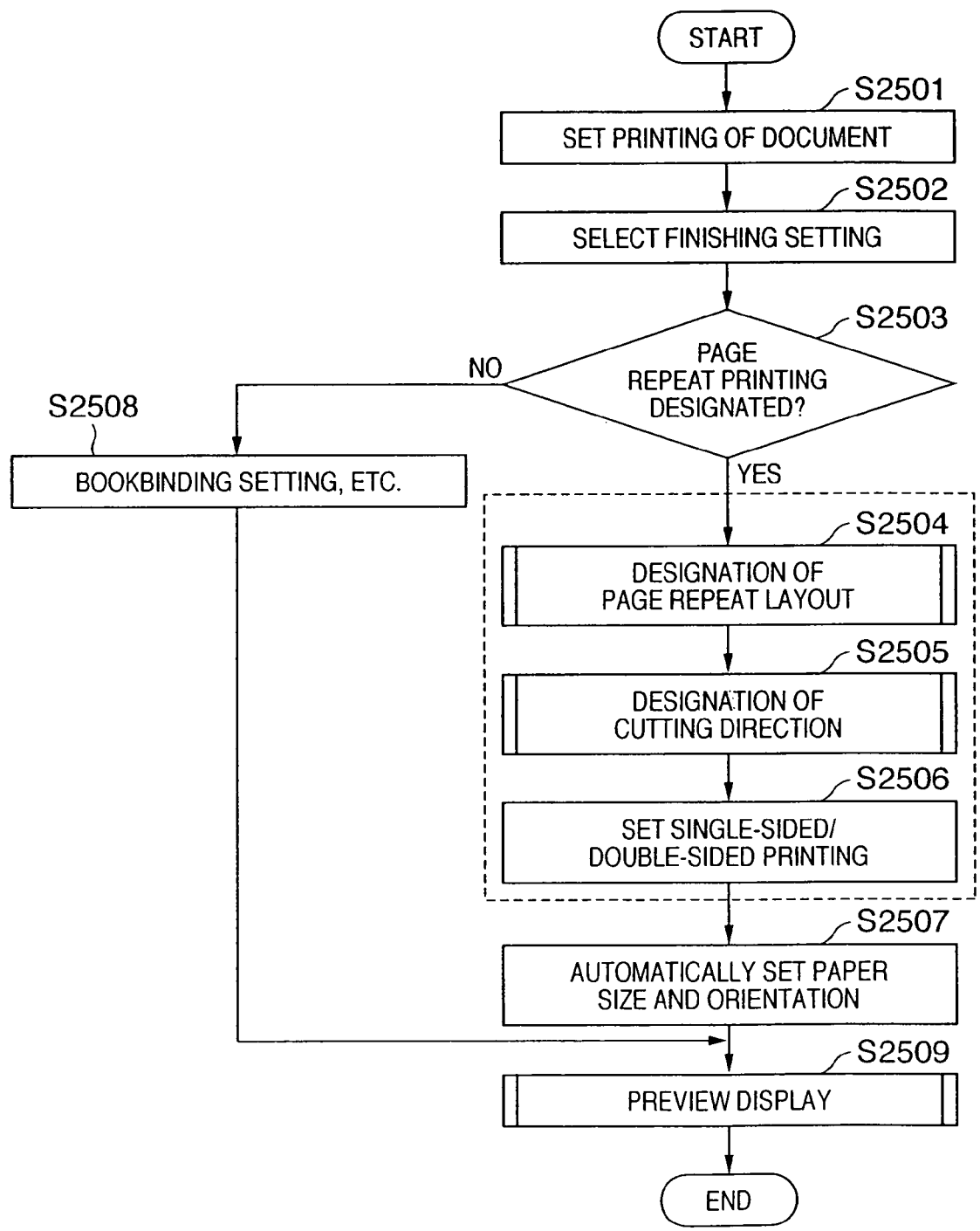
FIG. 25 is a flowchart showing the page repeat printing setting in the document processing system according to the embodiment.

Page repeat printing is a function of repetitively laying out the same data on a paper sheet and printing the data in order to output a printed result of laying out a document page by a plurality of copies on one paper sheet on the premise of cutting after printing. FIG. 25 is a flowchart showing the page repeat printing setting.

The process in FIG. 25 is part of a sequence by the bookbinding application 104, and is executed by the computer in FIG. 2. This also applies to other flowcharts. In step S2501 of FIG. 25, detailed setting for a document is designated. This setting is done by selecting "Print Setting for Document" from a pull-down menu displayed when the operator selects "print form" from a menu in the user interface window of the bookbinding application 104, as shown in FIG. 10. The process advances to step S2502, and if the operator selects a "finishing" tab from the print setting for the document, the page repeat layout can be set. FIG. 19 shows an example of a user interface displayed at this time.

The unit of copying in the page repeat layout is one print page used when no page repeat layout is set. That is, when no N-page layout is set, one document page serves as the unit of copying. When, however, the N-page layout is set, a set of N document pages laid out on one print page serves as the unit of the page repeat layout. For example, when a 2-page layout (2in1 layout) is set, the first and second document pages are reduced and laid out on one print page. If the page repeat layout, e.g., 2-time repeat layout is set, one original print page prepared by reducing and laying out the first and second document pages serves as the unit of the page repeat layout, and a print page (to be particularly called a page repeat printing page) is formed by laying out a plurality of (two for the 2-time page repeat layout) copies of the original print page. In this manner, the unit of copying in the page repeat layout is a content laid out on one print page as far as no page repeat layout is set. The unit of copying in the page repeat layout will be called a basic document page (or simply a basic page) for convenience. If no Nin1 layout is set, the document page and basic page coincide with each other. If the Nin1 layout is set, one basic page is made up of N document pages.

If no page repeat layout (page repeat printing) is set, bookbinding can be set. The page repeat layout is a function which premises cutting after printing, and when the page repeat layout is set, finishing such as stapling or punching of the bookbinding function cannot be simultaneously designated. When the page repeat layout is set, limited finishing settings are not displayed in the user interface window. Even if finishing is set, finishing settings are ignored in the page repeat layout.

The following settings are an example of setting items which cannot be compatible with the page repeat layout.
(1) Stapling (partial stapling)
(2) Punching
(3) Z-fold
(4) Cover using inserter
(5) Index paper
(6) Bookbinding printing
(7) Mixed paper sizes
(8) Copy unit/group When the page repeat layout (page repeat printing) is designated, settings (1) to (5) are cleared or ignored in executing printing. When setting (6) or (7) is designated, the GUI is so controlled as not to set any page repeat layout. For example, a page repeat layout column 1901 in FIG. 19 is not displayed at the finishing tab. Setting (8) cannot be selected in page repeat printing. Page repeat printing is generally fixed in the copy unit.

If the operator selects and operates the page repeat layout in step S2503, the process advances to step S2504. Note that step S2503 is a branch by the operator's will, and is not a process by the bookbinding application 104 itself.

In step S2504, a layout (2-time page repeat layout, 4-time page repeat layout, or the like) to be rasterized on a paper sheet is set in accordance with operation by the operator. FIG. 19 shows an example of the user interface of a setting dialog. The operator can select a desired value from choices such as "2-time page repeat printing" or "4-time page repeat printing" in the page repeat layout column 1901. A value corresponding to the setting is stored as a page repeat printing method in page repeat layout setting information of the book attribute (only after the "OK" or "Apply" button is clicked).

Figure 20:
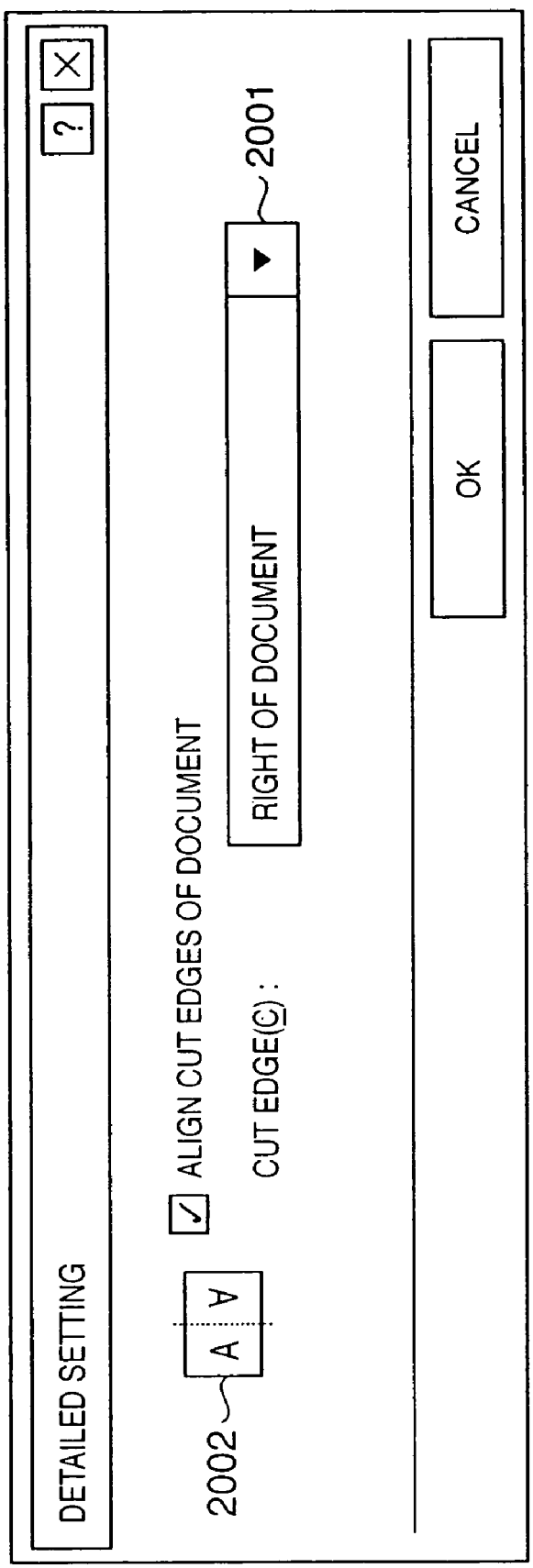
FIG. 20 is a view showing an example of a detailed layout setting window based on designation of the cutting direction when page repeat printing is set in the document processing system according to the embodiment.

The process advances to step S2505, and the cut plane after cutting a paper sheet is set for 2-time page repeat printing in accordance with operation by the operator. FIG. 20 shows the dialog image of cut plane designation. The operator can select the cut plane (cut edge) by selecting a detailed setting 1902. By designating the cut plane of page repeat printing, the operator can designate a side serving as a cut line. In FIG. 20, when an "align cut lines of document" check box is checked, which side of a document is designated as a cut edge can be selected. The selected value is saved as "cut edge selection" of page repeat layout information. As an icon 2002 in FIG. 20, an image illustrating a schematic layout is displayed in synchronism with items set by "page repeat printing method selection" and "cut edge selection" for the page repeat layout. FIG. 21 shows this example. Upper and lower rows in FIG. 21 represent layouts separately for portrait and landscape paper orientations. For the portrait paper orientation, the 2-time page repeat layout is set, an icon 2101 is displayed when no cut edge is designated, and an icon 2102 or 2103 is displayed when the cut edge is the head or tail. When the 4-time page repeat layout is set, an icon 2104 is displayed. For the landscape paper orientation, the 2-time page repeat layout is set, the icon 2101 is displayed when no cut edge is designated, and the icon 2102 or 2103 is displayed when the cut edge is the head or tail. When the 4-time page repeat layout is set, the icon 2104 is displayed.

The process advances to step S2506 to perform single-sided/double-sided setting of an output paper sheet in accordance with operation by the operator. When the double-sided setting is done, products cut after page repeat printing are made identical to upper and lower surfaces designated when no page repeat layout is set ("no page repeat layout") and the double-sided setting is done. The setting order in steps S2504 to S2506 can be arbitrary.

The process advances to step S2507 to determine an output paper size on the basis of the page repeat printing setting. When the 2-time page repeat layout is set for an A4 document page, two A4 document pages are laid out on one print page, and thus the paper size is A3. Similarly, for the 4-time page repeat layout, the paper size is A2. However, the output paper size is limited by the performance of a printing output apparatus, the page repeat layout (2-time page repeat layout, 4-time page repeat layout, or the like) is automatically limited by the paper size of an original document page. For example, when the original document page is A4 and the maximum printing size is A3, no 4-time page repeat layout can be set. The layout is limited by the user interface.

Figure 18:
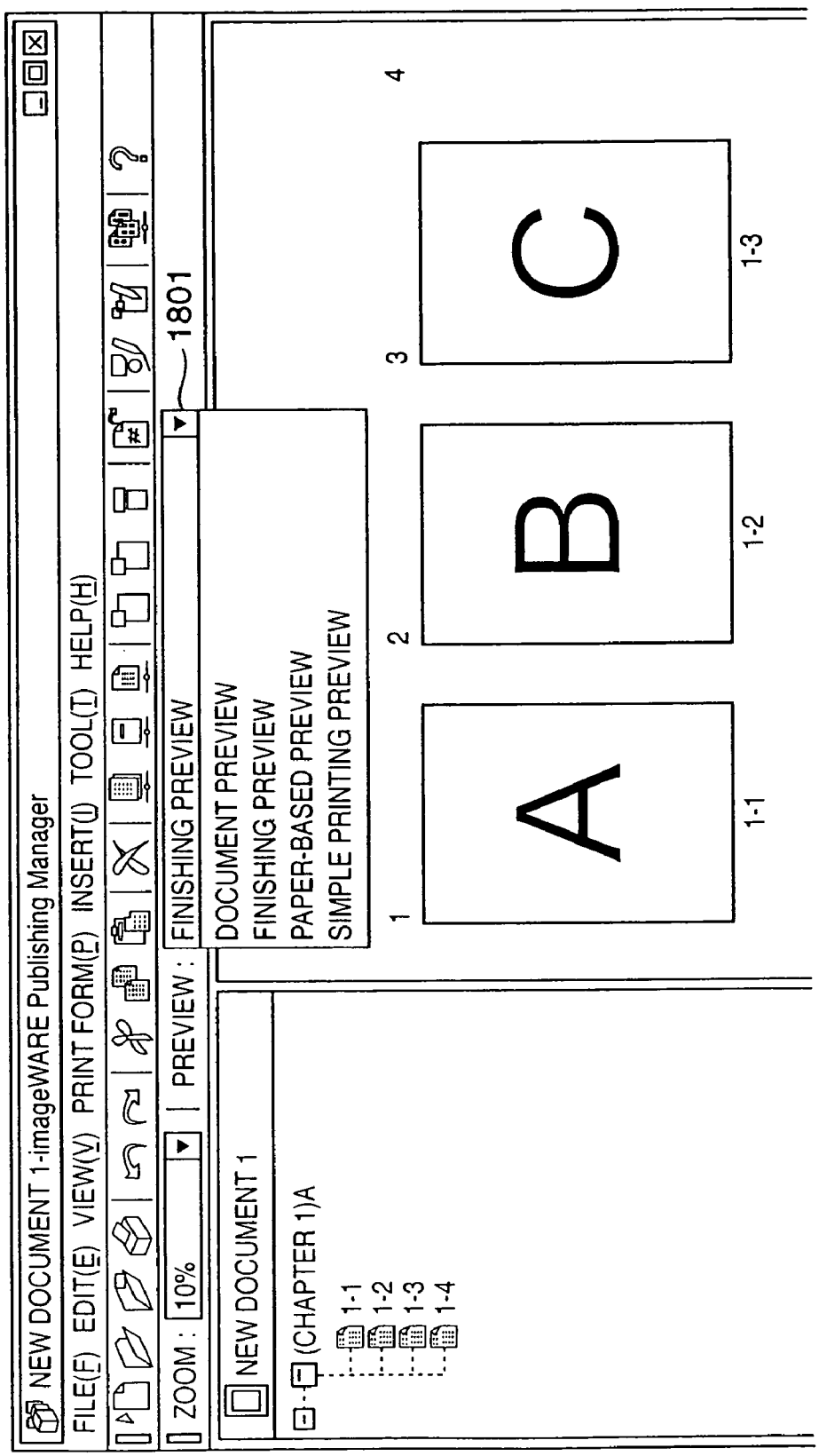
FIG. 18 is a view showing an example of a window when page repeat printing is set and the preview display form of the window is selected in the document processing system according to the embodiment.

After the page repeat layout is set, the process advances to step S2508 to generate intermediate data for monitor display, i.e., output document data and display the preview of document data of interest. The preview function provides the preview of each document page and the preview of a page repeat printing output image. FIG. 18 shows an example of preview display switching. As the preview mode, a "paper-based preview" mode can be selected from a menu column 1801 in addition to "document preview", "finishing preview", and "simple printing preview". By selecting one mode, the display is also switched in accordance with the mode. The paper-based preview displays as a preview image a printout paper sheet and the layout of a document page laid out on the paper sheet.

Figure 17:
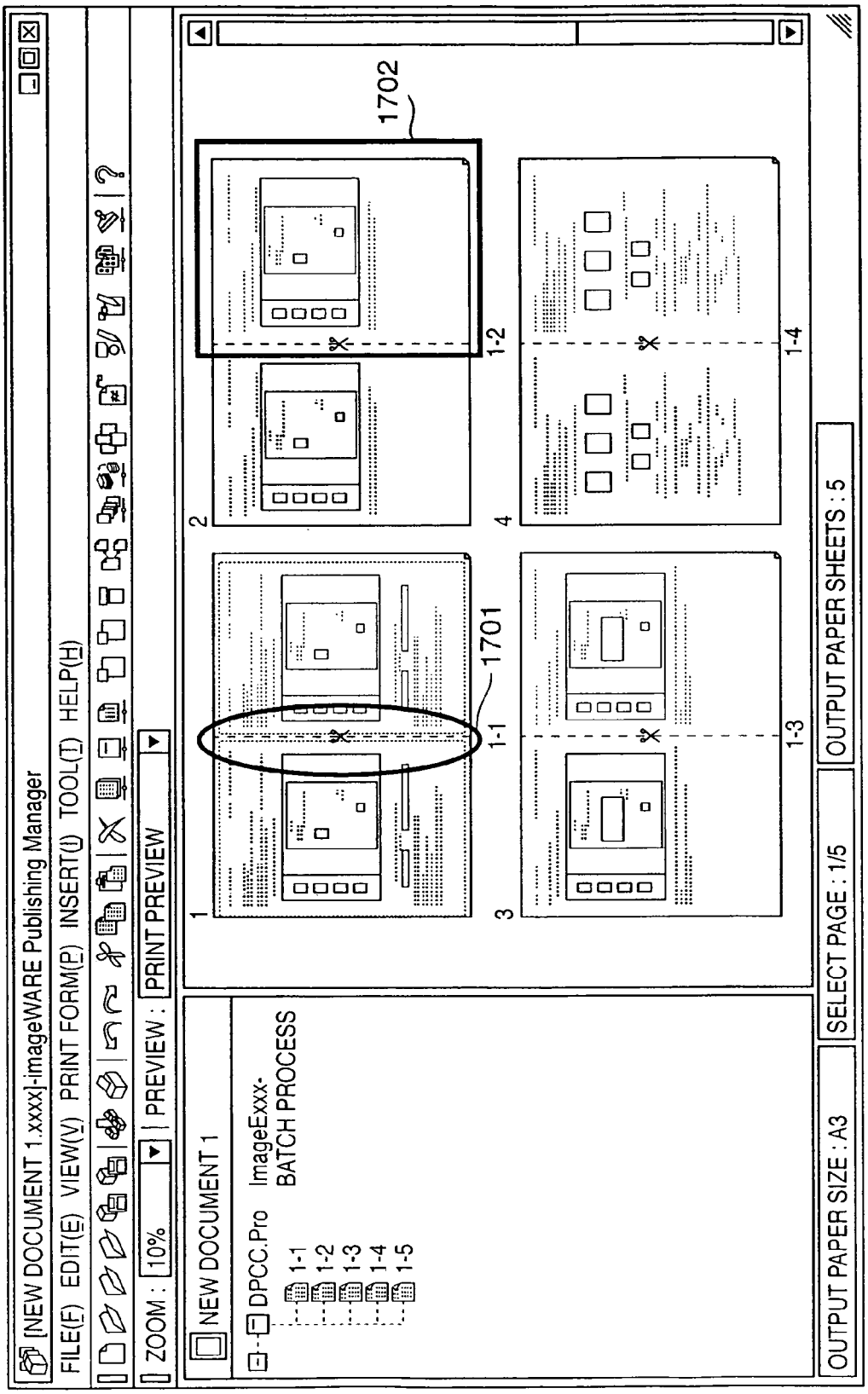
FIG. 17 is a view showing an example of a user interface window when page repeat printing is set in the document processing system according to the embodiment.

FIG. 17 shows an example of the preview display of page repeat printing in the paper-based preview mode. In page repeat printing, a preview is displayed in a format in which a plurality of basic pages (document pages unless any Nin1 layout is set) are to be printed on a single paper sheet. In order to make an editing target clear and discriminate page repeat printing from N-page (Nin1 layout) printing, one target basic page and copies of the basic page are displayed in dark and light tones so that they can be discriminated from each other. In the example of the 2-time page repeat layout in FIG. 17, a right document page is displayed in a normal color and the remaining document pages are displayed in a light color in order to represent that only one document page is subjected to editing and the remaining document pages are not subjected to editing. However, the discrimination method is not particularly limited in specifications. The drag & drop target line is limited so that the target line is not displayed in a print page displayed in the Nin1 layout and is displayed only between print pages, similar to the 1in1 layout. Note that the target line is a bar (border line) displayed to definitely discriminate a dropped region in handling a page by drag & drop. In page repeat printing, the cut position is so displayed as to make it clear that the operator intends cutting after printing. As a display example of the cut position, a dotted line with an image such as "scissors" desirably presents a cut line.

Figure 14B:
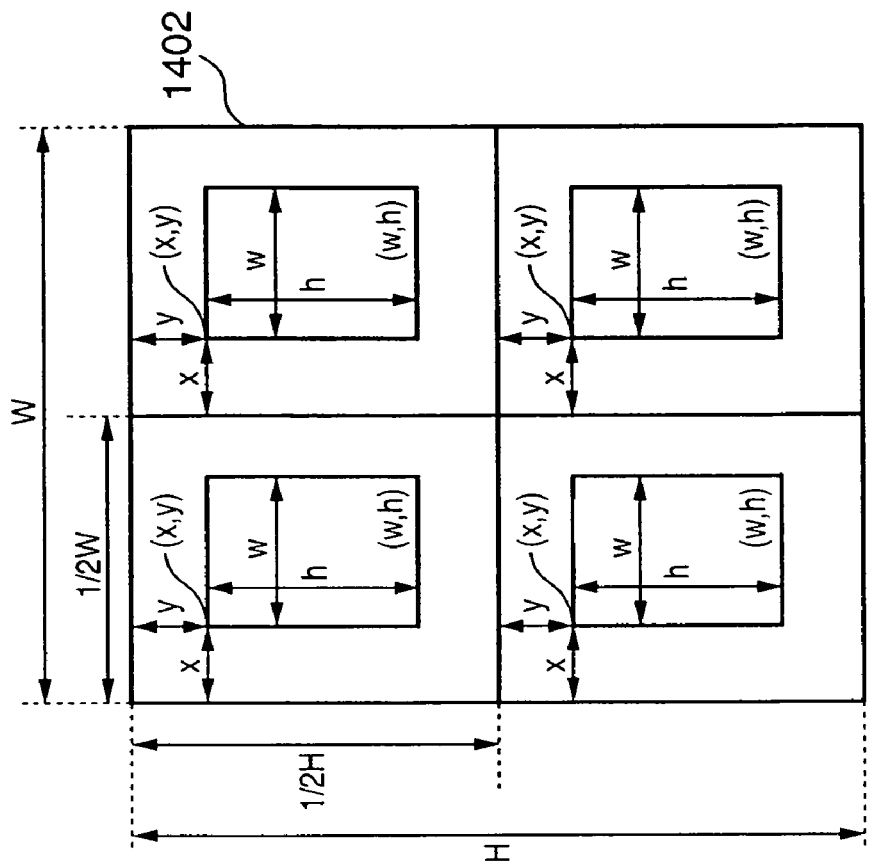
FIG. 14B is a view showing an example of the page layout of page repeat printing in the document processing system according to the embodiment.
Figure 14A:
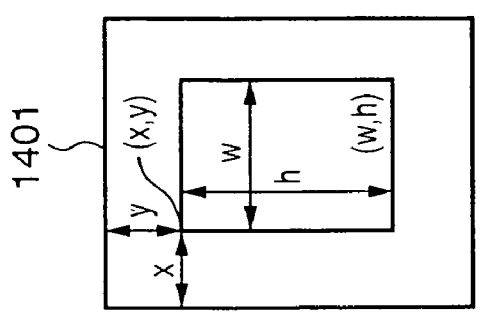
FIG. 14A is a view showing an example of a page layout when no page repeat printing is set in the document processing system according to the embodiment.

FIGS. 14A and 14B show the difference in layout between cases in which the page repeat layout is set (setting ON) and is not set (setting OFF). A layout 1401 in FIG. 14A is an example of a layout when the page repeat setting is OFF. A rectangle (corresponding to the contents of a basic page) having a width w and a height h is drawn at a position (x,y) from the upper left corner of a paper sheet. A layout 1402 in FIG. 14B is an example of a layout when the page repeat layout (4-time page repeat layout) is set. Letting W and H be the width and height of a paper sheet, rectangles each having (width, height)=(w,h) are drawn at positions (x,y) based on (0,0), (W/2,0), (0,H/2), and (W/2,H/2) from the upper left corner of a paper sheet. That is, figures each having a width and height (w,h) are drawn at positions (x,y), (x+W/2,y), (x,y+H/2), and (x+W/2,y+H/2) from the upper left corner of a paper sheet. In this way, the same basic page is copied and laid out.

FIG. 15 shows an example of the basic paper size of the page repeat layout. In step S2507 of FIG. 25, a paper size is determined in accordance with the table of FIG. 15. The table of FIG. 15 may be saved as data in a hard disk or the like by the bookbinding application 104. In FIG. 15, the maximum paper size is A3. If an original size (i.e., original document page) 1501 for the page repeat layout is determined, a size double the longitudinal or lateral length is a new paper size for the "2-time page repeat" layout, and a size double the longitudinal and lateral lengths is a new paper size.

Figure 16C:
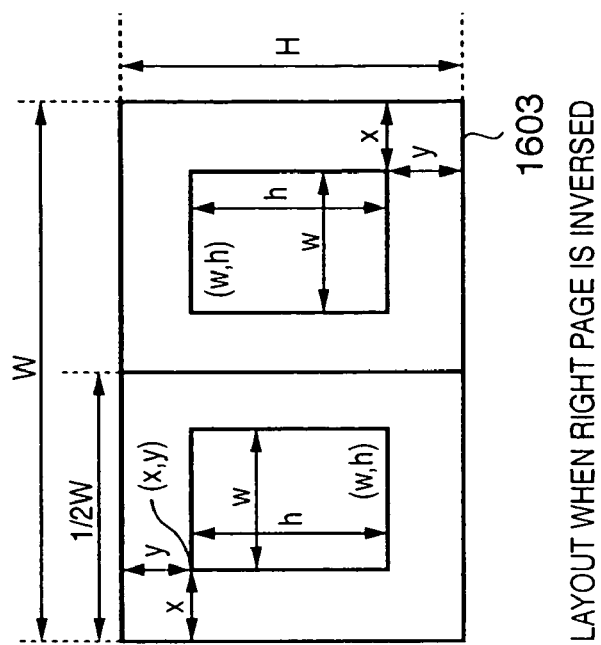
FIG. 16C is a view showing an example of a layout when page repeat printing is set on and the right page is inversed in the document processing system according to the embodiment.
Figure 16B:
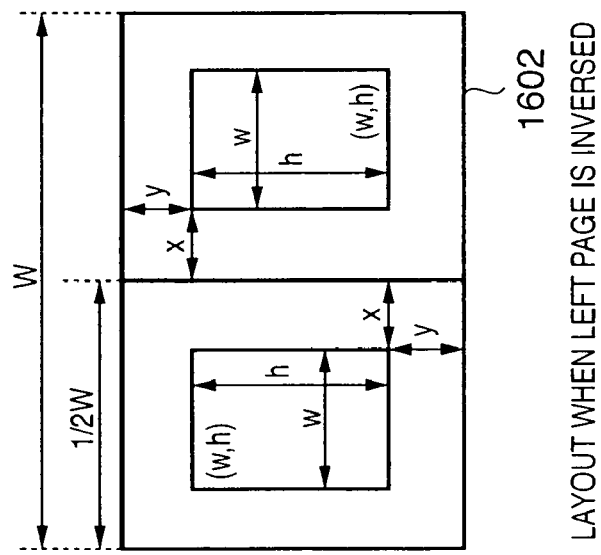
FIG. 16B is a view showing an example of a layout when page repeat printing is set on and the left page is inversed in the document processing system according to the embodiment.
Figure 16A:
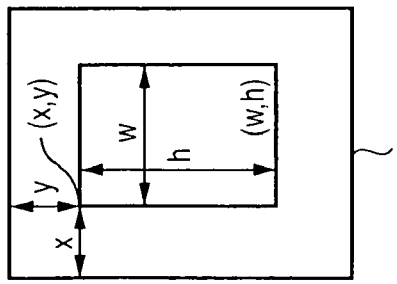
FIG. 16A is a view showing an example of a layout when page repeat printing is set off in the document processing system according to the embodiment.

In the 2-time page repeat layout, not only printing with head alignment but also a setting of changing the orientation of either data is possible. FIGS. 16A to 16C show examples of the layout in this case. Assume that the paper orientation is landscape, and the width and height of a paper sheet are W and H, respectively. A layout 1601 in FIG. 16A is an example of a layout when the page repeat printing setting is OFF. A layout 1602 in FIG. 16B is an example of a layout when left data is inversed. In this case, a rectangle having (width, height)=(w,h) is drawn at a position (x,y) based on (W/2,0) from the upper left corner of a paper sheet. Also, a rectangle which is rotated by 180° and has (width, height)=(w,h) is drawn at a position (−x,−y) based on (W/2,H) from the upper left corner of the paper sheet. A layout 1603 in FIG. 16C is an example of a layout when right data is inversed. In this case, a rectangle having (width, height)=(w,h) is drawn at a position (x,y) based on (0,0) from the upper left corner of a paper sheet. Also, a rectangle which is rotated by 180° and has (width, height)=(w,h) is drawn at a position (−x,−y) based on (W,H) from the upper left corner of the paper sheet. The case in which left data is inversed corresponds to the setting value "left" or "head" of "cut edge selection" of the page repeat layout setting. The case in which right data is inversed corresponds to the setting value "right" or "tail" of "cut edge selection" of the page repeat layout setting. These are merely definitions, and may be reversed. In this manner, the left (or upper) or right (or lower) basic page is rotated by 180° and laid out on a print page in accordance with the cut edge designation.

Figure 26:
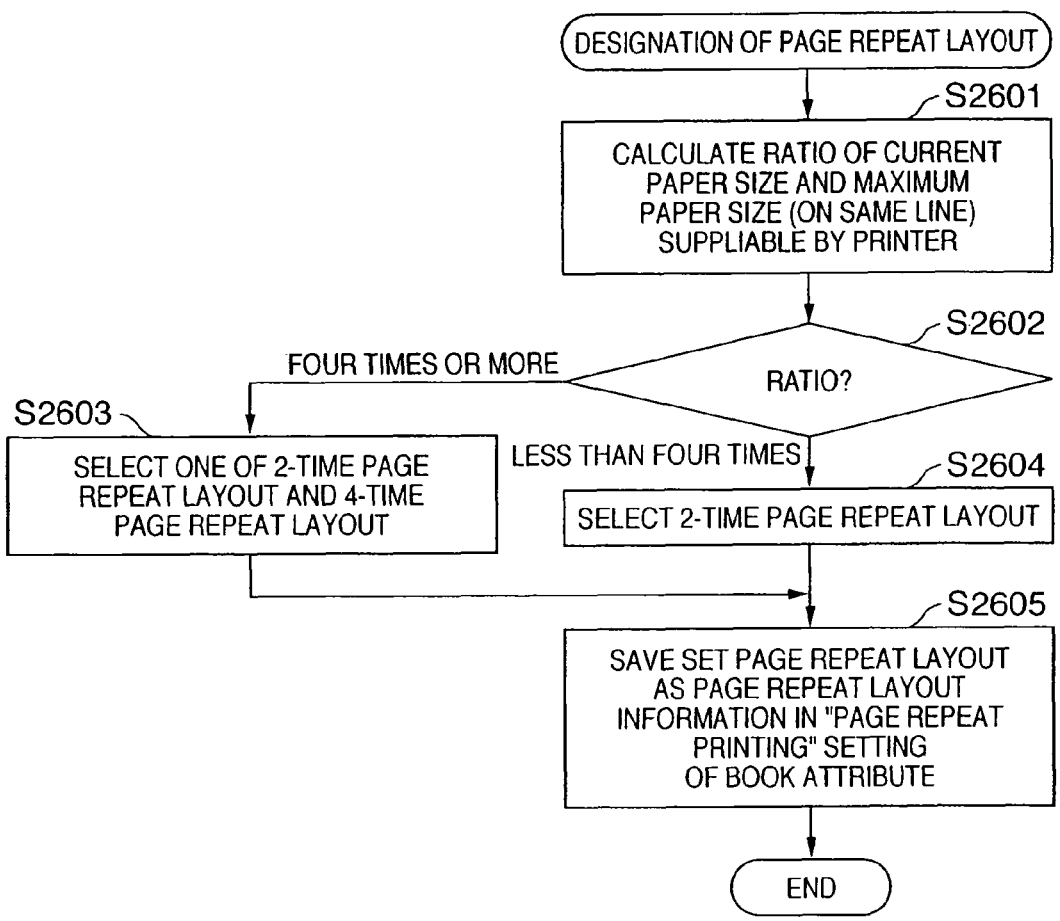
FIG. 26 is a flowchart showing a page repeat layout designation sequence in the page repeat printing setting flow in the document processing system according to the embodiment.

The flowchart of FIG. 25 will be explained in more detail. FIG. 26 shows details of step S2504 in FIG. 25. In step S2504, the ratio of the maximum paper size suppliable by a printer for use to the basic size (basic page) of the page repeat layout is calculated before the operator is prompted to designate the page repeat layout (S2601). It is determined whether the ratio is four times or more, if the ratio is four times or more, one of the 2-time page repeat layout and 4-time page repeat layout is displayed as a choice (S2603), and if the ratio is lower than four times, the 2-time page repeat layout is displayed as a choice (S2604). A page repeat layout method selected from the choices by the operator is saved as part of the page repeat layout setting information of the book attribute (S2605).

Figure 27:
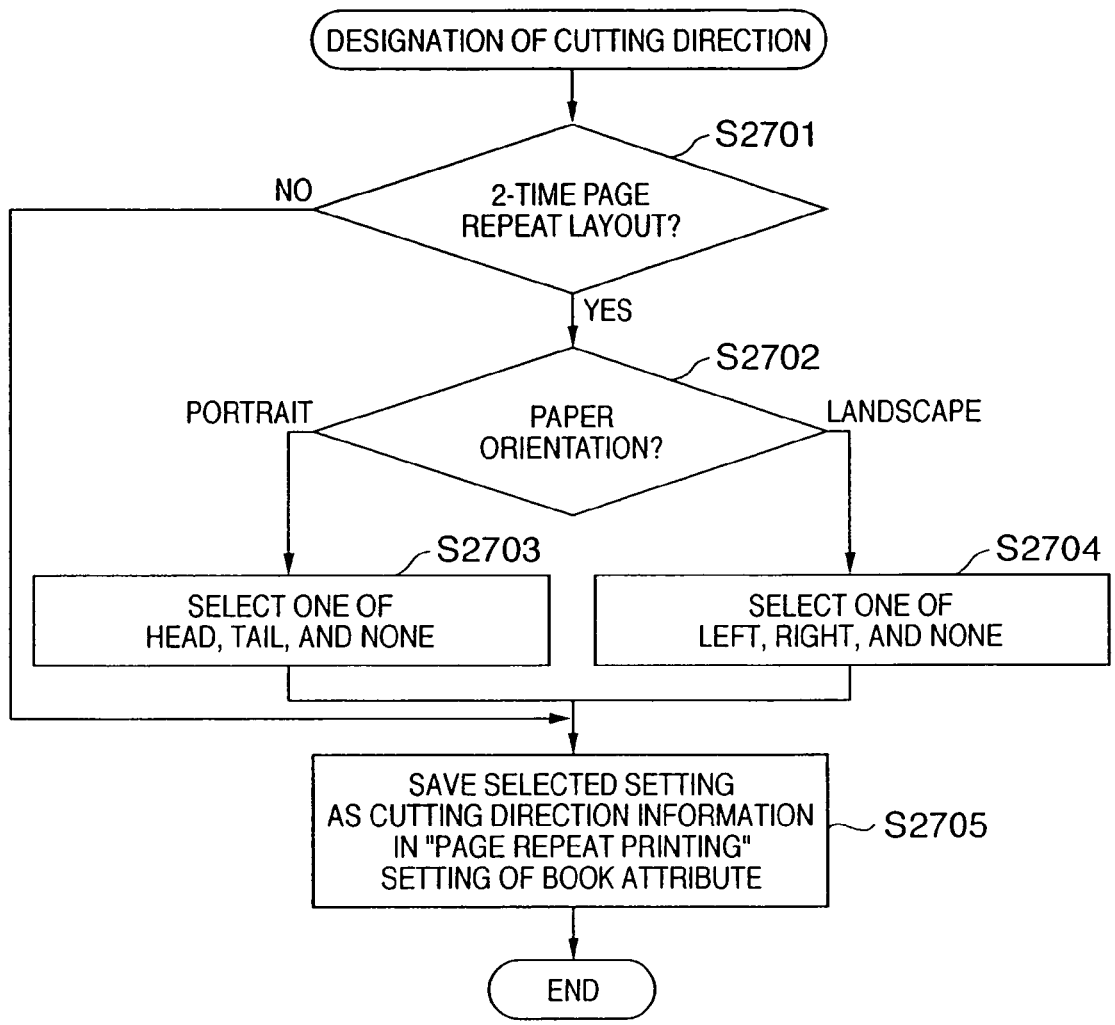
FIG. 27 is a flowchart showing a cutting designation sequence in the page repeat printing setting flow in the document processing system according to the embodiment.

Details of step S2505 are shown in FIG. 27. It is determined whether the page repeat layout method selected in step S2504 is the 2-time page repeat layout (S2701). For the 2-time page repeat layout, the process advances to selection of the cut edge. The cut edge is set only for the 2-time page repeat layout in the embodiment, but can also be set for the 4-time page repeat layout. In step S2702, the paper orientation is determined. Although the paper orientation can be set on all the three layers "book", "chapter", and "page", the paper orientation of the book attribute is referred to in the embodiment. In this example, the page repeat layout is set for each book, and the size is common to all pages in principle. This is because the purpose of the page repeat layout is to create two or four printed materials by cutting a printed material at once.

If the paper orientation is portrait, one of the head, the tail, and no designation is set as selection of the cut edge in accordance with operation by the operator (S2703), and recorded as part of page repeat layout information (S2705). If the paper orientation is landscape, one of the right, the left, and no designation is set as the cut edge in accordance with operation by the operator (S2704), and recorded as part of page repeat layout information (S2705).

Figure 28:
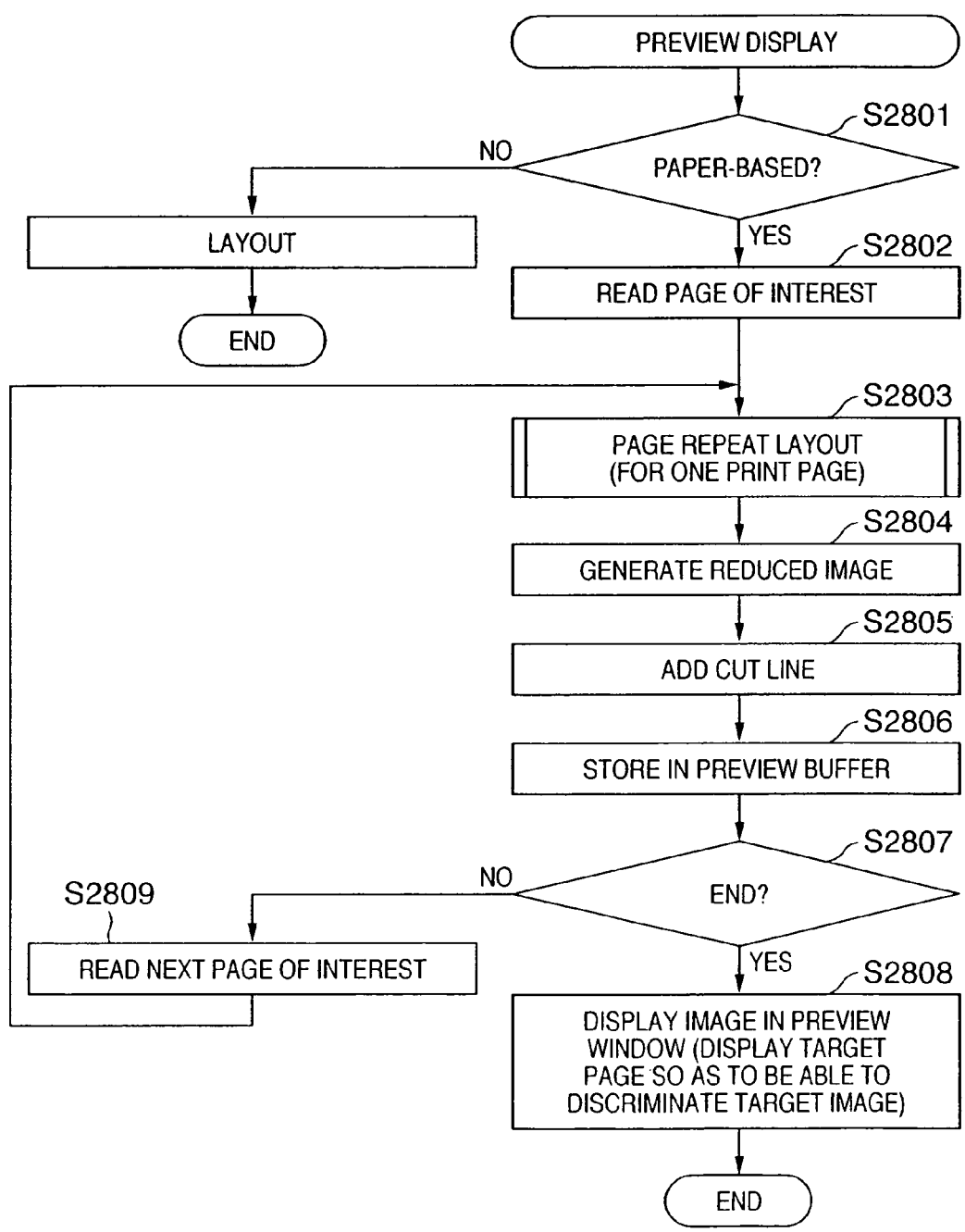
FIG. 28 is a flowchart showing a preview display sequence in the page repeat printing setting flow in the document processing system according to the embodiment.

FIG. 28 shows details of the preview display process in step S2509 of FIG. 25. In FIG. 28, only the "paper-based" mode will be described. In a mode other than the paper-based mode, a displayed preview image does not reflect the page repeat layout setting, and the page repeat layout cannot be recognized from the preview display.

In step S2801, it is determined whether the preview mode is "paper-based". If NO in step S2801, a preview is displayed in accordance with a set preview mode. For example, in a document page mode, the contents of each document page are displayed without any layout on a sheet.

In the "paper-based" preview mode, a document page of interest is read from edited document data (S2802). The number of document pages of interest is not limited to one, and all document pages which form a basic page (to be referred to as a basic page of interest) containing a page of interest are read. For example, for the Nin1 layout, N document pages are read as document pages of interest. Then, intermediate data is created by laying out the read document pages of interest on a print page in accordance with the page repeat layout setting information and N-up (=Nin1) setting information (S2803). At this time, the Nin1 layout attribute of the book attributes is referred to, and if this attribute is set, intermediate data which forms the basic page of interest is generated first. Then, intermediate data of print page is generated by laying out the basic page of interest on one print page in accordance with the page repeat printing method and cut edge selection designated by the page repeat layout setting information. The intermediate data has a format to be input to the electronic document de-spooler 105 in FIG. 1, and when input to a printer driver, can be converted into the PDL format for a printer. The intermediate data can be converted by the preview display program module (not shown) of the bookbinding application 104 into preview image data which simulates the print form. Intermediate data different between display and printing may also be generated. The intermediate data is data describing, e.g., the definition of an object serving as a part which forms an image, the position and size of the object which forms the image, and the repeat order. For example, when the document page is image data, the generated intermediate data is data describing the position and repeat order of a document page serving as an object. For example, when a document page of interest is page data having a plurality of objects, the intermediate data is data prepared by converting the positions and sizes of the objects contained as the page data of the document page into the positions and sizes of objects on a print page.

In step S2804, a reduced image for preview display is generated from the created intermediate data. This process is to lay out objects described in the intermediate data at described positions and convert the objects into bitmap image data at the preview display size.

At this time, a cut line is added to the reduced image, and a target basic page and the remaining basic pages which are laid out on one print page are processed so that they can be discriminated from each other on the display (S2805). Although a cut line is added to the created preview image in FIG. 28, a cut line may be added in creating intermediate data for preview display in step S2803 and a target basic page and the remaining basic pages may be processed so that they can be discriminated from each other on the display. In this case, the reduced image generated in step S2804 contains a cut line. Pages can be discriminated from each other on the display by decreasing the color saturation or luminance of a non-target page or adding a frame to a target basic page. A target basic page and the remaining basic pages are discriminated for convenience in order to simplify editing operation. Depending on the setting value of cut edge selection, the head/tail orientation of a basic page (document page) is inversed on a previewed print page. The basic page whose head/tail orientation is inversed is desirably so displayed as to prevent editing of this page.

In step S2806, the generated preview image of the print page containing the basic page of interest is stored in a preview buffer ensured in a RAM or the like. In step S2807, it is determined whether preview images have been generated for the entire document. If NO in step S2807, the next basic page of interest is read in step S2809, and the process branches to step S2803. If YES in step S2807, created preview images are displayed in the preview window of the user interface of the bookbinding application 104. The window size is limited, and when the document is large, some of created preview images are scrolled and displayed in accordance with operation. The scroll display and the like can be implemented as some of functions provided by the operating system.

The preview image in the "paper-based" mode displayed in step S2808 can present the operator with the display of the document after printing as if printed paper sheets were opened in the window.

Figure 29:
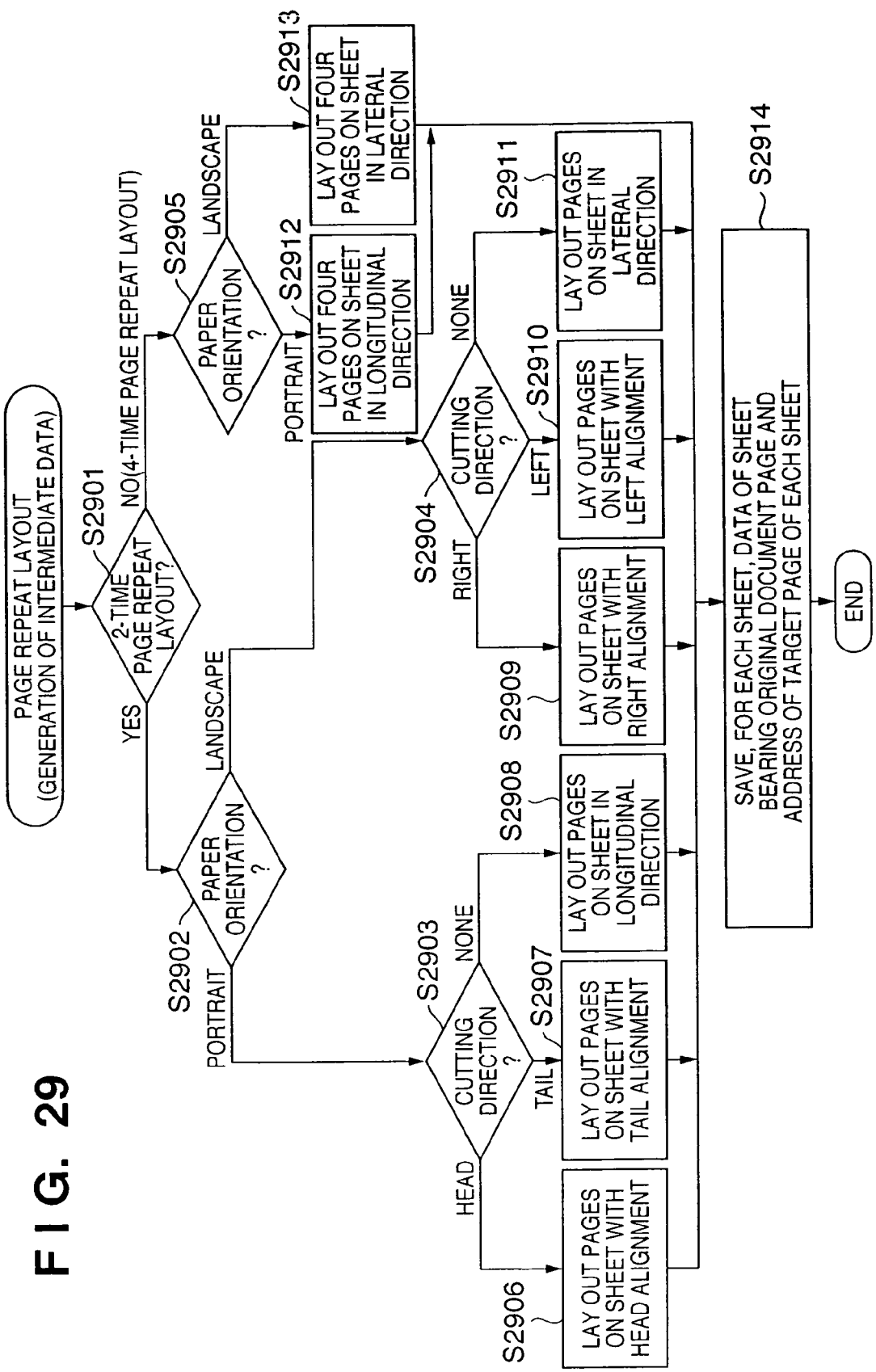
FIG. 29 is a flowchart showing a page repeat layout process in the document processing system according to the embodiment.

The page repeat layout process in step S2803 of FIG. 28 will be explained with reference to FIG. 29. The process in FIG. 29 is an intermediate data generation process. In practice, "lay out" in FIG. 29 does not mean a process of mapping two-dimensional image data in a memory, but coordinate transformation of vector data representing an object or the like is the entity of the "lay out" process.

In FIG. 29, it is determined whether the page repeat layout method is the 2-time page repeat layout (S2901). This determination is performed by referring to page repeat layout setting information of the book attribute. If the page repeat layout method is the 2-time page repeat layout, the current paper orientation setting (paper orientation of the book attribute) is determined (S2902). If the paper orientation is portrait, the cut edge selection (cutting direction) setting is tested (S2903). If the cut edge is "head", a copied page as a copy of an original basic page is rotated by 180° and laid out above the basic page so that the upper sides of the two pages oppose each other. This layout corresponds to the layout 1602 of FIG. 16B when viewed with the right side positioned down (S2906). If the cut edge is "tail", a copied page as a copy of an original basic page is rotated by 180° and laid out below the basic page so that the lower sides of the two pages oppose each other. This layout corresponds to the layout 1603 of FIG. 16C when viewed with the right side positioned down (S2907). If no cut edge is set, a copied page as a copy of an original basic page is directly laid out above the basic page (S2908).

If the paper orientation is landscape, the cut edge selection (cutting direction) setting is tested (S2904). If the cut edge is "right", a copied page as a copy of an original basic page is rotated by 180° and laid out on the right side of the basic page so that the right sides of the two pages oppose each other. This layout corresponds to the layout 1603 of FIG. 16C (S2909). If the cut edge is "left", a copied page as a copy of an original basic page is rotated by 180° and laid out on the left side the basic page so that the left sides of the two pages oppose each other. This layout corresponds to the layout 1602 of FIG. 16B (S2910). If no cut edge is set, a copied page as a copy of an original basic page is directly laid out on the right or left side of the basic page (S2911).

If the page repeat layout method is the 4-time page repeat layout, the paper orientation is determined (S2905), and four copies of a basic page are laid out in a 2×2 layout in accordance with the paper orientation (S2912 and S2913).

Data of each print page obtained by laying out the basic page in accordance with the page repeat layout setting information, and address information representing the position of an editable basic page laid out on each print page are saved. The address information is used to display an editable basic page and the remaining basic pages so that they can be discriminated from each other. In step S2914, information on the cut line and basic page discrimination display may be contained in generated intermediate data.

Figure 31:
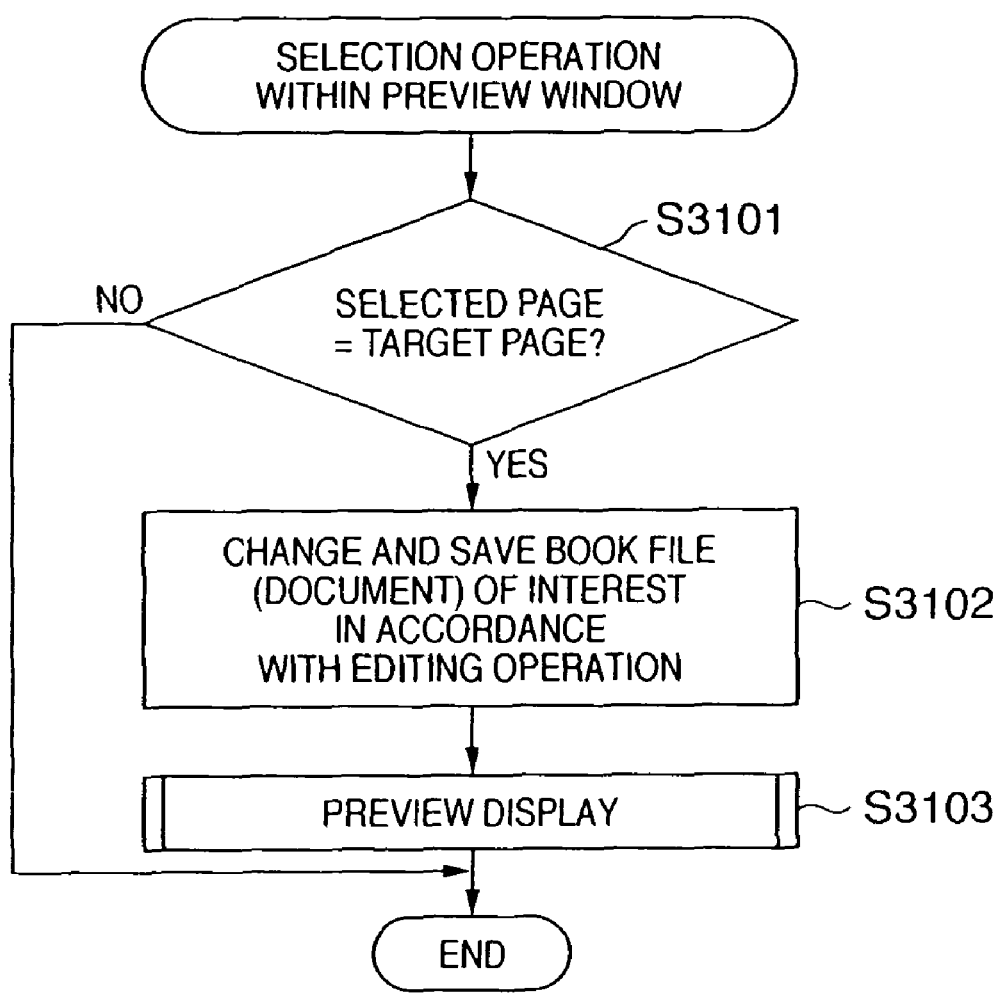
FIG. 31 is a flowchart showing an editing process based on operation of a preview window in the document processing system according to the embodiment.

In this way, a document having the page repeat layout setting is previewed. Editing operation is limited in the preview display window of the page repeat layout. FIG. 31 shows a simple sequence of this editing operation. FIG. 31 shows a process when any page is selected from a user interface window as shown in FIG. 17 and the operator executes any editing operation. In step S3101, it is determined whether a selected document page is a target basic page of the page repeat layout. If a basic page other than a target one is selected, the operation is ignored. If a target basic page is selected, a book file of interest is changed and saved in accordance with the operation (S3102). After that, edited contents are previewed (S3103). This sequence is the process of FIG. 28.

As a result, only one of basic pages laid out on one sheet is subjected to editing in a user interface which previews a document having the page repeat layout setting in the paper-based mode. This can improve the operability and prevent the operator from being confused. Note that a basic page contains a plurality of document pages prepared by reducing, laying out, and combining N document pages into one page in the Nin1 layout. By designating cut edge selection, the cut edge directions of documents which are printed out, cut, and finally combined can be aligned to improve the document quality. In the preview mode, the contents of a document can be displayed in advance before printing in the document page mode, and an actual print form can be displayed in the paper-based preview mode.

Figure 32:
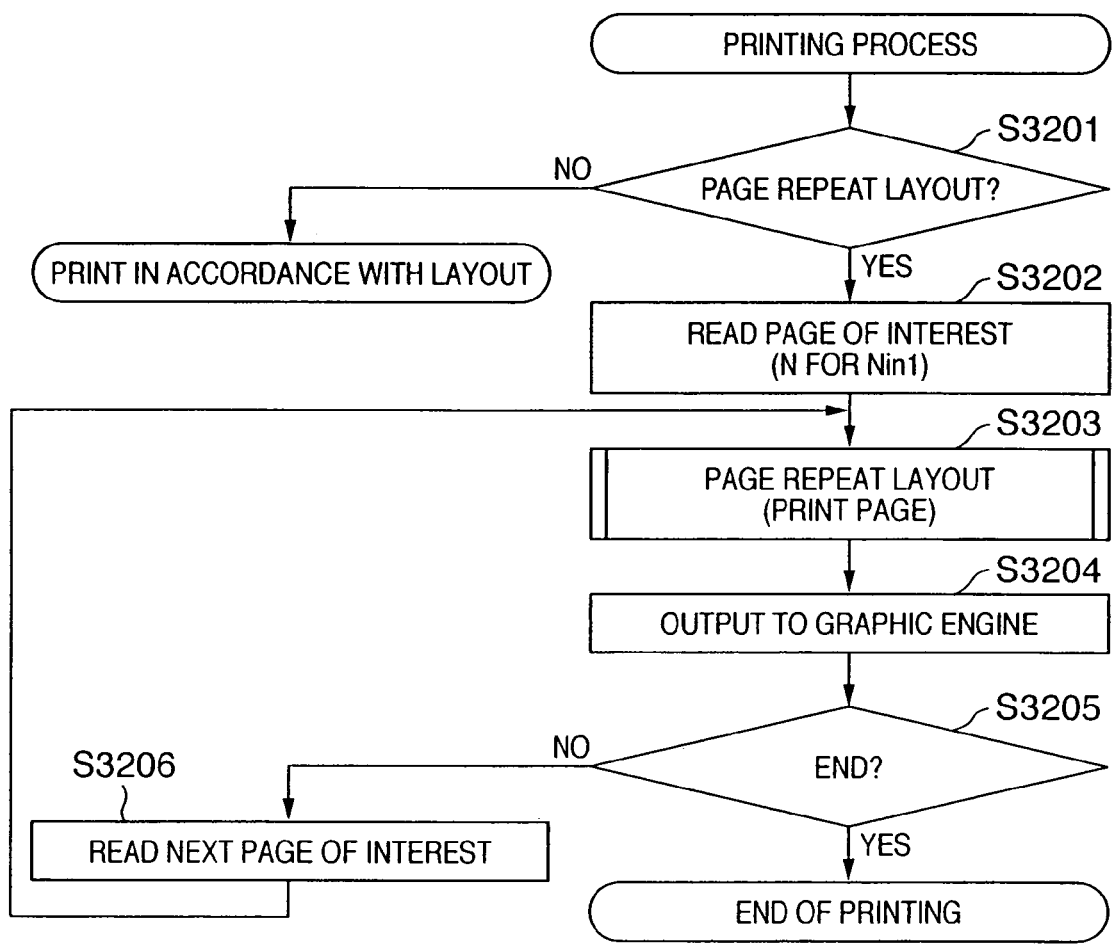
FIG. 32 is a flowchart showing a printing process for a document having the page repeat layout in the document processing system according to the embodiment.

FIG. 32 shows a process sequence in printing a document having the page repeat layout setting. A value is tested by referring to page repeat layout setting information from the book attribute (S3201), and if the page repeat layout is set, a page of interest is read (S3202). If the Nin1 layout is set, all N pages combined together with a page of interest are read. The page repeat layout is performed by the same sequence as that of FIG. 29 (S3203). Created intermediate data is output to a graphic engine provided by the operating system via the electronic document de-spooler. The operating system converts the intermediate data into the PDL of a format complying with a printer for use via a predetermined printer driver, outputs the converted data to the printer, and prints the data (S3204). This is repeated for the entire document (S3205 and S3206). In this way, the document can be printed out with the page repeat layout. In printing a document having the page repeat layout, a cutting designation paper sheet can be added to the head of the document. The cutting designation paper sheet is a paper sheet on which only cut lines are drawn. When a designated page repeat layout is the 2-time page repeat layout, a line which divides a longitudinal side into two equal parts is cutting designation line, and when a designated page repeat layout is the 4-time page repeat layout, lines which divide a sheet into four equal parts of a 2×2 layout are cutting designation lines. Printing is performed on a paper sheet bearing cutting designation lines, printed materials are superposed, and a bundle of paper sheets is cut along the cutting designation lines, thereby easily creating copies of a document. Whether to print on a cutting designation paper can also be contained in the book attribute as a position setting value contained in the page repeat layout information. In this case, printing is done on a cutting designation paper sheet by referring to the setting.

<Coexistence with Nin1 Layout>

Figure 30:
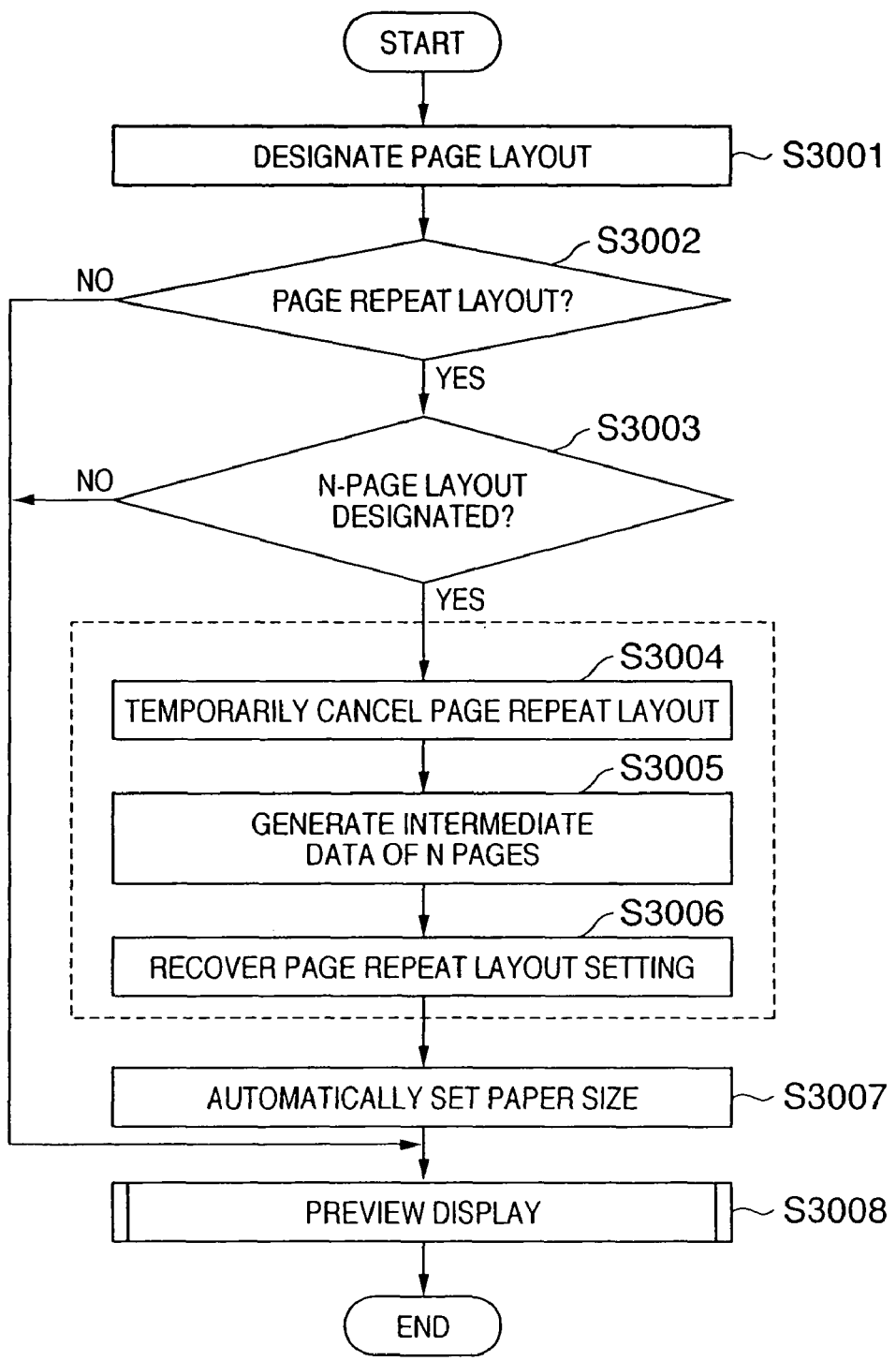
FIG. 30 is a flowchart showing mixed setting of page repeat printing and N-page printing in the document processing system according to the embodiment.

FIG. 30 is a flowchart showing mixed setting of page repeat printing and N-page printing. FIG. 25 can also be applied to a case in which the page repeat layout is set for a document having the Nin1 layout. That is, these two layouts can coexist by setting the page repeat layout as if N document pages combined by the Nin1 layout were one document page. FIG. 30 shows a process sequence when the Nin1 layout is set for a document having the page repeat layout setting.

In step S3001, the page repeat printing (e.g., vertical 2-time page repeat printing) is set, a user interface as shown in FIG. 23 is opened, and the operator designates a page layout from a page layout column 2301 of FIG. 23. FIG. 23 is a view showing an example of a dialog when N-page display printing (two pages: left→right printing) is set on a paper sheet in the page layout. In this case, the bookbinding application 104 operates as follows.

It is determined in step S3002 whether the page repeat layout has been set. "The page repeat layout has been set" means that either "2-time page repeat layout" or "4-time page repeat layout" (in the embodiment) has been set in page repeat layout information. If the page repeat layout has been set, the process advances to step S3003. In step S3003, it is determined whether N-page printing (=Nin1) has been selected. If N-page printing has been set, the process advances to step S3004 to set the page repeat layout OFF temporarily. The setting value of the page repeat layout immediately before setting the page repeat layout OFF is saved in a predetermined memory. In this state, intermediate data of a basic page prepared by laying out document pages in Nin1 is generated in step S3005. As already described above, the intermediate data defines the layout of document pages or objects serving as the contents of the document pages. In step S3006, the value saved in step S3004 is restored to the page repeat layout setting. The paper size of page repeat printing is automatically set in step S3007, and the basic page of the Nin1 layout is laid out at each reference point on a paper sheet in accordance with page repeat layout setting information in step S3008. Finally, intermediate data for display is generated and previewed on the monitor.

Figure 24B:
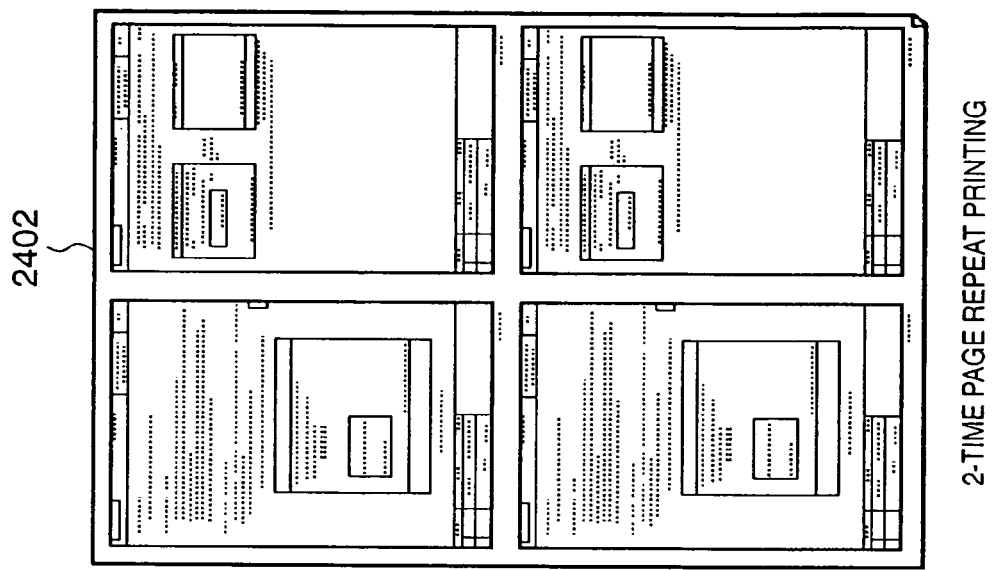
FIG. 24B is a view showing an example of a layout when 2in1 is set on and page repeat printing is also set on in the document processing system according to the embodiment.
Figure 24A:
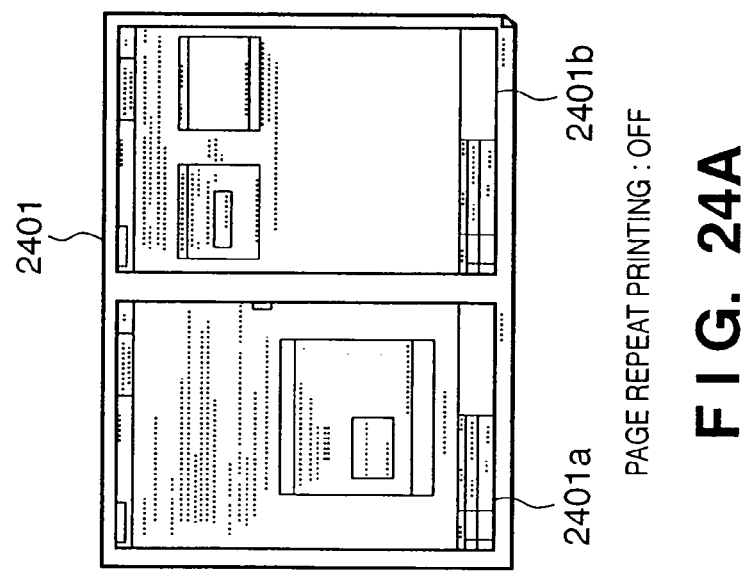
FIG. 24A is a view showing an example of a layout when 2in1 is set on and page repeat printing is set off in the document processing system according to the embodiment.

FIG. 24B shows a layout image when N-page page repeat printing is set. For example, when 2in1 setting is ON, a layout in which document pages 2401*a* and 2401*b* are laid out in 2in1 is a basic layout (basic page 2401; see FIG. 24A), and the basic page 2401 serves as the unit of the page repeat layout. In the 2-time page repeat layout, a page 2402 prepared by laying out the basic page two times is previewed or printed out, as shown in FIG. 24B. The relationship with the page layout function is based on "a printed material not subjected to page repeat printing is identical to a printed material having undergone page repeat printing after cutting".

FIG. 22 is a view showing images of a cutting designation paper sheet and page repeat printing output. By outputting a cutting line designation paper sheet 2201, a cutting designation paper sheet with cutting lines can be output as an inserting paper sheet at the start in page repeat printing.

As has been described above, according to the embodiment, both the layout of document pages and the printing layout can be confirmed as a preview in creating a page repeat printing material which outputs the printed results of copies on one paper sheet.

Further, high-visibility preview display of a printed result can be implemented for a document having the page repeat printing layout setting.

When a printed material having the page repeat layout is to be created, a printed material in which a document is easily laid out can be created by only preparing a document of a page.

Single-sided/double-sided printing control, imposition control for the N-page printing layout, and editing control in the preview display mode can be easily executed in editing a document having the page repeat layout.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-121871 filed on Apr. 16, 2004, which is hereby incorporated by reference herein.

What is claimed is:

1. A document processing apparatus capable of generating document data, comprising:
a page repeat layout setting save unit which saves page repeat layout setting information designated by a user;
a generator which generates output document data containing a page on which a basic page and at least one copied page of the basic page are laid out based on the page repeat layout setting information, wherein the basic page is a print page if the page repeat layout setting is not set by said page repeat layout setting save unit, or the basic page is an original page from which the copied page is copied if the page repeat layout setting is set;
a display controller which displays a preview image of the document data based on the output document data generated by said generator; and
an editor which edits the preview image in accordance with editing operation of the user for the preview image displayed by said display controller,
wherein said editor accepts the editing operation by the user for the basic page among the basic page and the at least one copied page included in the preview image which corresponds to the print page, but does not accept the editing operation by the user for the copy page included in the preview image; and
if the basic page is edited in accordance with the editing operation on the basic page, said display controller displays a preview image in which the to-be-edited basic page is replaced by an edited basic page and in which a copy page of the to-be-edited basic page is replaced by a copy page of the edited basic page.

2. The apparatus according to claim 1, wherein said display controller displays the basic page and the copy page so as to be able to discriminate the basic page and the copy page.

3. The apparatus according to claim 1, wherein said display controller further has a document display mode in which the document data is displayed for each page in addition to a print display mode in which the document data is displayed in the print form in a display window.

4. The apparatus according to claim 1, further comprising a layout setting save unit which saves N-page layout setting information designated by the user,
wherein when an N-page layout is set by the N-page layout setting information, said display controller displays the preview image on which a plurality of different pages are arranged on the print sheet in accordance with the N-page layout setting information.

5. The apparatus according to claim 1, further comprising a printing controller which causes a printing unit to print the document data.

6. A document processing method capable of generating document data, comprising:
a page repeat layout setting save step of saving page repeat layout setting information in save means in accordance with designation by a user;
a generation step of generating output document data containing a print page on which a basic page and at least one copied page of the basic page are laid out based on the page repeat layout setting information, wherein the basic page is a print page if the page repeat layout setting is not set in said page repeat layout setting save step, or the basic page is an original page from which the copied page is copied if the page repeat layout setting is set;
a display control step of displaying a preview image of the document data based on the output document data generated in the generation step; and an editing step of editing the preview image in accordance with editing operation of the user for the preview image displayed in said display control step, wherein, in said editing step, an editing operation is accepted from the user for the basic page among the basic page and the at least one copied page included in the preview image which corresponds to the print page, but not accepted from the user for the copy page included in the preview image; and if the basic page is edited in accordance with the editing operation on the basic page, said display control step displays a preview image in which the to-be-edited basic page is replaced by an edited basic page and in which a copy page of the to-be-edited basic page is replaced by a copy page of the edited basic page.

7. A program which is recorded on a non-transitory computer readable recording medium and causes a computer to execute a document process of generating document data, the program causing the computer to execute:

a page repeat layout setting save step of saving page repeat layout setting information in save means in accordance with designation by a user;

a generation step of generating output document data containing a print page on which a basic page and at least one copied page of the basic page are laid out based on the page repeat layout setting information, wherein the basic page is a print page if the page repeat layout setting is not set in said page repeat layout setting save step, or the basic page is an original page from which the copied page is copied if the page repeat layout setting is set;

a display control step of displaying a preview image of the document data based on the output document data generated in the generation step; and an editing step of editing the preview image in accordance with editing operation of the user for the preview image displayed in said display control step, wherein, in said editing step, an editing operation is accepted from the user for the basic page among the basic page and the at least one copied page included in the preview image which corresponds to the print page, but not accepted from the user for the copy page included in the preview image; and if the basic page is edited in accordance with the editing operation on the basic page, said display control step displays a preview image in which the to-be-edited basic page is replaced by an edited basic page and in which a copy page of the to-be-edited basic page is replaced by a copy page of the edited basic page.

8. A document processing apparatus capable of generating document data, comprising:

a page repeat layout setting save means for saving page repeat layout setting information in save means in accordance with designation by a user;

a generation means for generating output document data containing a print page on which a basic page and at least one copied page of the basic page are laid out based on the page repeat layout setting information, wherein the basic page is a print page if the page repeat layout setting is not set by said page repeat layout setting save means, or the basic page is an original page from which the copied page is copied if the page repeat layout setting is set;

a display control means for displaying a preview image of the document data based on the output document data generated by said generation means; and an editing means for editing the preview image in accordance with editing operation of the user for the preview image displayed by said display control means, wherein said editing means accepts the editing operation by the user for the basic page among the basic page and the at least one copied page included in the preview image which corresponds to the print page, but does not accept the editing operation by the user for the copy page included in the preview image; and if the basic page is edited in accordance with the editing operation on the basic page, said display control means displays a preview image in which the to-be-edited basic page is replaced by an edited basic page and in which a copy page of the to-be-edited basic page is replaced by a copy page of the edited basic page.

9. The document processing apparatus according to claim 1, wherein the page repeat layout setting information includes information indicative of whether or not to align, in the print page, an adjoining side of the basic page with an adjoining side of the copied page of the basic page, and in a case where the setting is set for aligning the adjoining side of the basic page with the adjoining side of the copied page of the basic page, said display controller displays a print preview image in which one side of the basic page, which adjoins the copied page of the basic page, coincides with one side of the copied page of the basic page, which adjoins the basic page.

10. The document processing apparatus according to claim 9, wherein the page repeat layout setting information includes information for designating which side is to be aligned in the print page in a case of aligning an adjoining side of the basic page with an adjoining side of the copied page of the basic page, and wherein said display controller displays a print preview image in which the basic page and the copied page of the basic page are aligned at the side designated by the page repeat layout setting information.

11. The document processing apparatus according to claim 9, wherein an adjoining side of the basic page and an adjoining side of the copied page of the basic page are a sheet-trimming edge of a print material, and wherein said display controller displays a print preview image which identifiably shows that the basic page and the copied page of the basic page are trimmed at the adjoining side.

* * * * *